United States Patent
Murdoch et al.

(10) Patent No.: US 11,245,524 B2
(45) Date of Patent: Feb. 8, 2022

(54) BINDING OF DECENTRALIZED IDENTIFIERS TO VERIFIED CLAIMS

(71) Applicant: Microsoft Technology Licensing, LLC, Redmond, WA (US)

(72) Inventors: Brandon Murdoch, Reading (GB); Ankur Patel, Sammamish, WA (US); Ronald John Kamiel Eurphrasia Bjones, Dilbeek (BE); Daniel James Buchner, Los Gatos, CA (US)

(73) Assignee: MICROSOFT TECHNOLOGLY LICENSING, LLC, Redmond, WA (US)

(*) Notice: Subject to any disclaimer, the term of this patent is extended or adjusted under 35 U.S.C. 154(b) by 289 days.

(21) Appl. No.: 16/445,099

(22) Filed: Jun. 18, 2019

(65) Prior Publication Data

US 2020/0403795 A1   Dec. 24, 2020

(51) Int. Cl.
*H04L 29/06* (2006.01)
*H04L 9/32* (2006.01)

(52) U.S. Cl.
CPC ............ *H04L 9/321* (2013.01); *H04L 9/3247* (2013.01); *H04L 9/3236* (2013.01); *H04L 2209/38* (2013.01)

(58) Field of Classification Search
CPC ..... H04L 9/321; H04L 9/3247; H04L 9/3236; H04L 2209/38
See application file for complete search history.

(56) References Cited

U.S. PATENT DOCUMENTS

| | | | |
|---|---|---|---|
| 11,063,760 B2* | 7/2021 | Subba | H04L 9/0894 |
| 2017/0109759 A1* | 4/2017 | Korb | G06Q 30/018 |
| 2018/0285996 A1* | 10/2018 | Ma | G06F 16/2428 |
| 2018/0326291 A1 | 11/2018 | Tran et al. | |
| 2018/0343126 A1 | 11/2018 | Fallah et al. | |
| 2019/0222424 A1* | 7/2019 | Lindemann | H04L 9/3252 |
| 2019/0229909 A1* | 7/2019 | Patel | H04L 63/102 |
| 2019/0253254 A1* | 8/2019 | Brownlee | G06K 19/0725 |
| 2019/0272548 A1* | 9/2019 | Korb | G06Q 30/018 |

(Continued)

OTHER PUBLICATIONS

"Why Decentralized Identifiers are Changing the Future of the Internet, Identity and Finance—SelfKey", Retrieved From: https://selfkey.org/decentralized-identifiers-article/, Apr. 11, 2019, 12 Pages.

(Continued)

*Primary Examiner* — Ghodrat Jamshidi
(74) *Attorney, Agent, or Firm* — Workman Nydegger

(57) ABSTRACT

Using an association data structure corresponding to a derived decentralized identifier of a subject entity to share a verified claim about the subject entity to one or more relying entities. A decentralized identifier of a subject entity is derived from a source decentralized identity of the subject entity. Next, an association data structure is created using the derived decentralized identifier. The association data structure is structured to be interpretable by a relying entity as demonstrating that a verified claim is about the derived decentralized identity. The relying entity is then caused to be provided the verified claim about the subject entity. The verified claim includes the association data structure that was created using the derived decentralized identifier.

20 Claims, 13 Drawing Sheets

(56) References Cited

U.S. PATENT DOCUMENTS

2019/0319940 A1* 10/2019 Hamel ................. H04L 9/3271
2019/0333054 A1* 10/2019 Cona ....................... G06F 21/31

OTHER PUBLICATIONS

Barbir, Abbie, "Updated text for X.dlt-sec, Security considerations for using DLT data in Identity Management;C-0471", In International Telecommunication union, Telecommunication Standardization Sector, SG17-C-0471, Study Group 17, Jan. 22, 2019, 19 Pages.
"International Search Report and Written Opinion Issued in PCT Application No. PCT/US2020/031395", dated Jul. 10, 2020, 15 Pages.

* cited by examiner

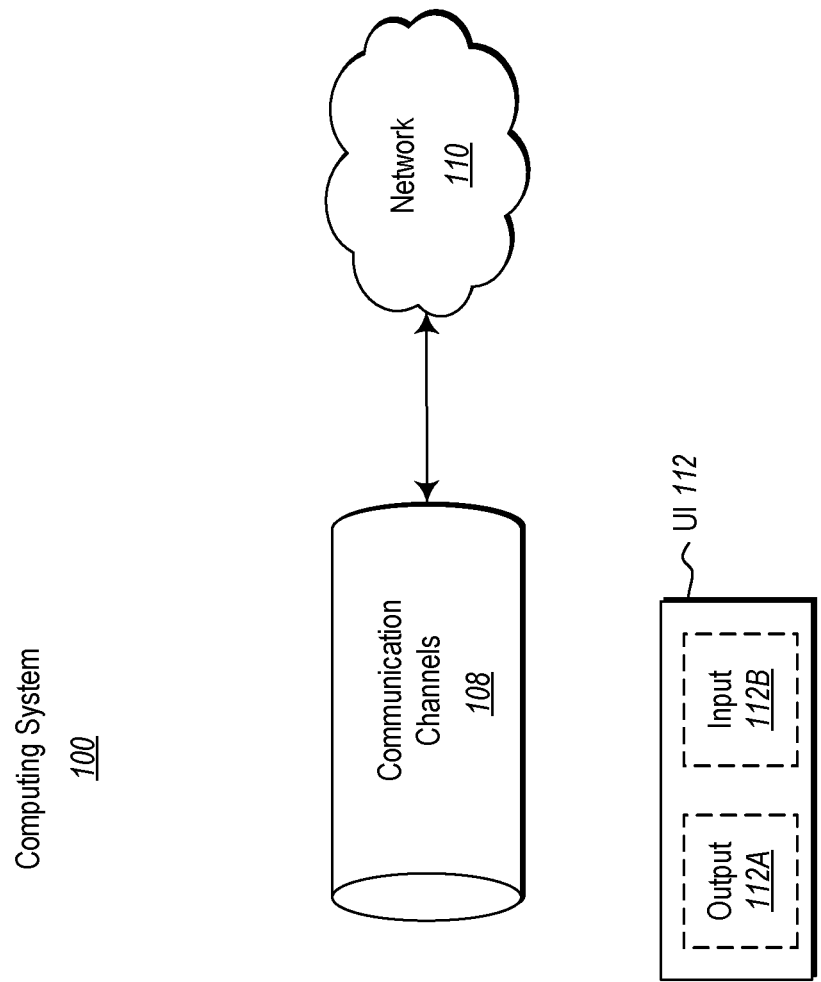
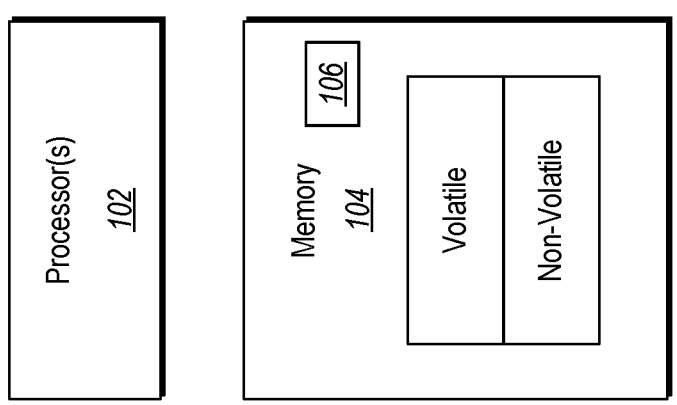
FIG. 1

```
900

Claim Metadata      {
910                   "@context": [
                        " ... "
                      ],
                      "id": "http:// state-A-dmv.org /dls/1234",           911
                      "type": ["VerifiableClaim", "Driver's License"],     912
                      "issuer": "https://state-A-dmv.org/issuers/5678",    913
                      "issue date": "2019-05-20",                          914
                      "expiration date": "2019-06-20".                     915

Claim(s)            "ClaimSubject": {
920                   "id1": "association data structure of DID1",         921
                      "id2": "association data structure of DID2",         922
                      ...                                                  923
                      "AllowedToDrive": "Yes",                             924
                    }, Proof(s)            "proof": {
930                   "type": "RsaSignature2018",                          931
                      "created": "2019-05-18",                             932
                      "creator": "state-A-dmv.org /issuers/keys/1",        933
                      "signature": "abcedfghijklmnopqrstuvwxyz...."        934
                    }, Proof(s)            "proof": { ...
940                 }
```

*FIG. 9*

BINDING OF DECENTRALIZED IDENTIFIERS TO VERIFIED CLAIMS

BACKGROUND OF THE INVENTION

Most of currently used documents or records that prove identity are issued by centralized organizations, such as governments, schools, employers, or other service centers or regulatory organizations. These organizations often maintain every member's identity in a centralized identity management system. A centralized identity management system is a centralized information system used for organizations to manage the issued identities, their authentication, authorization, roles and privileges. Centralized identity management systems have been deemed as secure since they often use professionally maintained hardware and software. Typically, the identity issuing organization sets the terms and requirements for registering people with the organization. Finally, when a party needs to verify another party's identity, the verifying party often needs to go through the centralized identity management system to obtain information verifying and/or authenticating the other party's identity. Decentralized Identifiers (DIDs) are a new type of identifier, which are independent of any centralized registry, identity provider, or certificate authority. Distributed ledger technology (such as blockchain) provides the opportunity for using fully decentralized identifiers. Distributed ledger technology uses globally distributed ledgers to record transactions between two or more parties in a verifiable way. Once a transaction is recorded, the data in the section of ledger cannot be altered retroactively without the alteration of all subsequent sections of the ledger, which provides a fairly secure platform.

In such a decentralized environment, a claim related to an owner of DID can be verified via a claim issuing entity, and the owner of DID can send such a verified claim to any relying entity. Each user may have multiple DIDs. One verified claim may be linked to the multiple DIDs owned by the same user, such that the claim issuing entity can find out the correlations amongst the multiple DIDs.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

This Summary is provided to introduce a selection of concepts in a simplified form that is further described below in the Detailed Description. This Summary is not intended to identify key features or essential features of the claimed subject matter, nor is it intended to be used as an aid in determining the scope of the claimed subject matter.

Embodiments disclosed herein are related to binding of decentralized identifiers (DIDs) to verified claims. The binding of DIDs to verified claims are implemented in a decentralized network that implements a distributed ledger. The distributed ledger is configured to back up one or more DIDs for one or more users of the computing system. First, a decentralized identifier is derived for the subject entity. Next, an association data structure is created using the derived decentralized identifier. The association data structure is structured to be interpretable by a relying entity as demonstrating that a verified claim is about the derived decentralized identity. The system then causes the relying entity to be provided with the verified claim about the subject entity. The verified claim includes the association data structure that was created using the derived decentralized identifier.

In some embodiments, the association data structure may be encoded data generated by the decentralized identifier using a one-way encoding, such that the claim issuing entity cannot reconstruct the derived decentralized identifier from the association data structure. Accordingly, even though the claim issuing entity issues the verified claim associated with the association data structure, the claim issuing entity will not be able to correlate the derived DID with the source DID. Thus, the privacy of the derived DID is further protected from the claim issuing entity.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and details through the use of the accompanying drawings in which:

FIG. 1 illustrates an example computing system in which the principles described herein may be employed;

FIG. 9 illustrates an example verified claim that is capable of protecting the privacy of the derived DID from the claim issuing entity;

DETAILED DESCRIPTION

Figure 2:
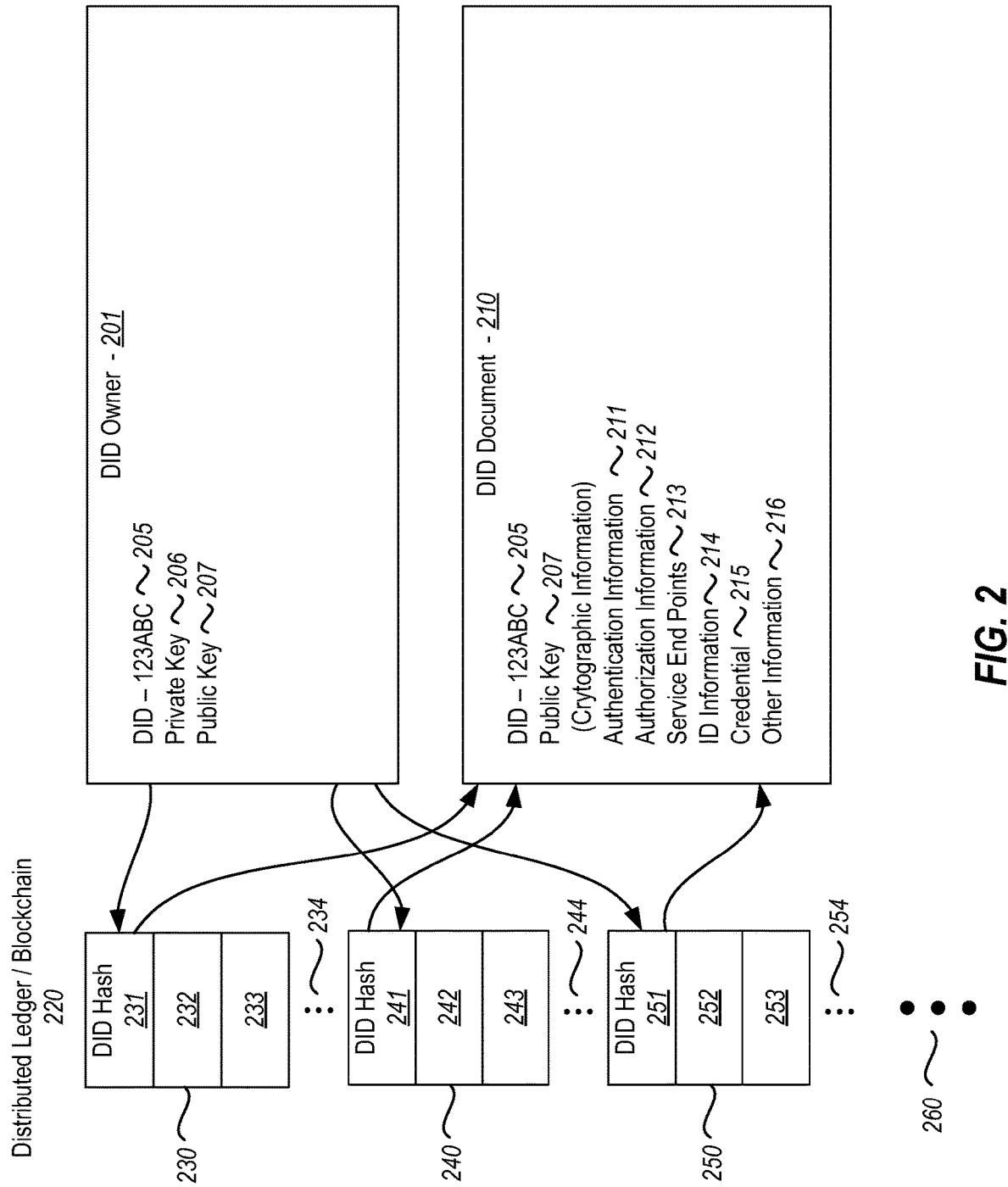
FIG. 2 illustrates an example environment for creating a decentralized identification or identifier (DID)

Embodiments disclosed herein are related to binding of decentralized identifiers (DIDs) to verified claims. The binding of DIDs to verified claims are implemented in a decentralized network that implements a distributed ledger. The distributed ledger is configured to back up one or more DIDs for one or more users of the computing system. First, a decentralized identifier is derived for the subject entity. Next, an association data structure is created using the derived decentralized identifier. The association data structure is structured to be interpretable by a relying entity as demonstrating that a verified claim is about the derived decentralized identity. The system then causes the relying entity to be provided with the verified claim about the subject entity. The verified claim includes the association data structure that was created using the derived decentralized identifier.

In some embodiments, the association data structure may be encoded data generated by the decentralized identifier using a one-way encoding, such that the claim issuing entity cannot reconstruct the derived decentralized identifier from the association data structure. Accordingly, even though the claim issuing entity issues the verified claim associated with the association data structure, the claim issuing entity will not be able to correlate the derived DID with the source DID. Thus, the privacy of the derived DID is further protected from the claim issuing entity.

Because the principles described herein may be performed in the context of a computing system, some introductory discussion of a computing system will be described with respect to FIG. 1. Then, this description will return to the principles of the DID platform with respect to the remaining figures.

Computing systems are now increasingly taking a wide variety of forms. Computing systems may, for example, be handheld devices, appliances, laptop computers, desktop computers, mainframes, distributed computing systems, data centers, or even devices that have not conventionally been considered a computing system, such as wearables (e.g., glasses). In this description and in the claims, the term "computing system" is defined broadly as including any device or system (or a combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

As illustrated in FIG. 1, in its most basic configuration, a computing system 100 typically includes at least one hardware processing unit 102 and memory 104. The processing unit 102 may include a general purpose processor and may also include a field programmable gate array (FPGA), an application specific integrated circuit (ASIC), or any other specialized circuit. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

The computing system 100 also has thereon multiple structures often referred to as an "executable component". For instance, the memory 104 of the computing system 100 is illustrated as including executable component 106. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods, and so forth, that may be executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such structure may be computer readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures, such as hard coded or hard wired logic gates, that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "agent", "manager", "service", "engine", "module", "virtual machine" or the like may also be used. As used in this description and in the case, these terms (whether expressed with or without a modifying clause) are also intended to be synonymous with the term "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data. If such acts are implemented exclusively or near-exclusively in hardware, such as within a FPGA or an ASIC, the computer-executable instructions may be hard coded or hard wired logic gates. The computer-executable instructions (and the manipulated data) may be stored in the memory 104 of the computing system 100. Computing system 100 may also contain communication channels 108 that allow the computing system 100 to communicate with other computing systems over, for example, network 110.

While not all computing systems require a user interface, in some embodiments, the computing system 100 includes a user interface system 112 for use in interfacing with a user. The user interface system 112 may include output mechanisms 112A as well as input mechanisms 112B. The principles described herein are not limited to the precise output mechanisms 112A or input mechanisms 112B as such will depend on the nature of the device. However, output mechanisms 112A might include, for instance, speakers, displays, tactile output, holograms and so forth. Examples of input mechanisms 112B might include, for instance, microphones, touchscreens, holograms, cameras, keyboards, mouse of other pointer input, sensors of any type, and so forth.

Embodiments described herein may comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM, or other optical disk storage, magnetic disk storage, or other magnetic storage devices, or any other physical and tangible storage medium which can be used to store desired program code means in the form of computer-executable instructions or data structures and which can be accessed by a general purpose or special purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general purpose or special purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then eventually transferred to computing system RAM and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general purpose computing system, special purpose computing system, or special purpose processing device to perform a certain function or group of functions. Alternatively or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses) and the like. The invention may also be practiced in distributed system environments where local and remote computing system, which are linked (either by hardwired data links, wireless data links, or by a combination of hardwired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

The remaining figures may discuss various computing system which may correspond to the computing system 100 previously described. The computing systems of the remaining figures include various components or functional blocks that may implement the various embodiments disclosed herein as will be explained. The various components or functional blocks may be implemented on a local computing system or may be implemented on a distributed computing system that includes elements resident in the cloud or that implement aspects of cloud computing. The various components or functional blocks may be implemented as software, hardware, or a combination of software and hardware. The computing systems of the remaining figures may include more or less than the components illustrated in the figures and some of the components may be combined as circumstances warrant. Although not necessarily illustrated, the various components of the computing systems may access and/or utilize a processor and memory, such as processor 102 and memory 104, as needed to perform their various functions.

Some introductory discussion of a decentralized identification (DID) and the environment is which they are created and reside will not be given with respect to FIG. 2. As illustrated in FIG. 2, a DID owner 201 may own or control a DID 205 that represents an identity of the DID owner 201. The DID owner 201 may register a DID using a creation and registration service, which will be explained in more detail below.

The DID owner 201 may be any entity that could benefit from a DID. For example, the DID owner 201 may be a human being or an organization of human beings. Such organizations might include a company, department, government, agency, or any other organization or group of organization. Each individual human being might have a DID while the organization(s) to which each belongs might likewise have a DID.

The DID owner 201 may alternatively be a machine, system, or device, or a collection of machine(s), device(s) and/or system(s). In still other embodiments, the DID owner 201 may be a subpart of a machine, system or device. For instance, a device could be a printed circuit board, where the subpart of that circuit board are individual components of the circuit board. In such embodiments, the machine or device may have a DID and each subpart may also have a DID. A DID owner might also be a software component such as the executable component 106 described above with respect to FIG. 1. An example of a complex executable component 106 might be an artificial intelligence. An artificial intelligence may also own a DID.

Thus, the DID owner 201 may be any reasonable entity, human or non-human, that is capable of creating the DID 205 or at least having the DID 205 created for and associated with them. Although the DID owner 201 is shown as having a single DID 205, this need not be the case as there may be any number of DIDs associated with the DID owner 201 as circumstances warrant.

As mentioned, the DID owner 201 may create and register the DID 205. The DID 205 may be any identifier that may be associated with the DID owner 201. Preferably, that identifier is unique to that DID owner 201, at least within a scope in which the DID is anticipated to be in use. As an example, the identifier may be a locally unique identifier, and perhaps more desirably a globally unique identifier for identity systems anticipated to operate globally. In some embodiments, the DID 205 may be a Uniform Resource identifier (URI) (such as a Uniform Resource Locator (URL)) or other pointer that relates the DID owner 201 to mechanism to engage in trustable interactions with the DID owner 201.

The DID 205 is "decentralized" because it does not require a centralized, third party management system for generation, management, or use. Accordingly, the DID 205 remains under the control of the DID owner 201. This is different from conventional centralized IDs based trust on centralized authorities and that remain under control of the corporate directory services, certificate authorities, domain name registries, or other centralized authority (referred to collectively as "centralized authorities" herein). Accordingly, the DID 205 may be any identifier that is under the control of the DID owner 201 and independent of any centralize authority.

In some embodiments, the structure of the DID 205 may be as simple as a username or some other human understandable term. However, in other embodiments, the DID 205 may preferably be a random string of number and letters for increased security. In one embodiment, the DID 205 may be a string of 128 letters and numbers. Accordingly, the embodiments disclosed herein are not dependent on any specific implementation of the DID 205. In a very simple example, the DID 205 is shown as "123ABC".

As also shown in FIG. 2, the DID owner 201 has control of a private key 206 and public key 207 pair that are associated with the DID 20. Because the DID 205 is independent of any centralized authority, the private key 206 should at all times be fully in control of the DID owner 201. That is, the private and public keys should be generated in a decentralized manner that ensures that they remain under the control of the DID owner 201.

As will be described in more detail to follow, the private key 206 and public key 207 pair may be generated on a device controlled by the DID owner 201. The private key 206 and public key 207 pair should not be generated on a server controlled by any centralized authority as this may cause the private key 206 and public key 207 pair to not be fully under the control of the DID owner 201 at all times. Although FIG. 2 and this description have described a private and public key pair, it will also be noted that other types of reasonable cryptographic information and/or mechanism may also be used as circumstances warrant.

FIG. 2 also illustrates a DID document 210 that is associated with the DID 205. As will be explained in more detail to follow, the DID document 210 may be generated at the time that the DID 205 is created. In its simplest form, the DID document 210 describes how to use the DID 205. Accordingly, the DID document 210 includes a reference to the DID 205, which is the DID that is described by the DID document 210. In some embodiments, the DID document 210 may be implemented according to methods specified by a distributed ledger 220 that will be used to store a representation of the DID 205 as will be explained in more detail to follow. Thus, the DID document 210 may have different methods depending of the specific distributed ledger.

The DID document 210 also includes the public key 207 created by the DID owner 201 or some other equivalent cryptographic information. The public key 207 may be used by third party entities that are given permission by the DID owner 201 to access information and data owned by the DID owner 201. The public key 207 may also be used by verify that the DID owner 201 in fact owns or controls the DID 205.

The DID document 210 may also include authentication information 211. The authentication information 211 may specify one or more mechanisms by which the DID owner 201 is able to prove that the DID owner 201 owns the DID 205. In other words, the mechanisms of authentication information 211 may show proof of a binding between the DID 205 (and thus it's DID owner 201) and the DID document 210. In one embodiment, the authentication information 211 may specify that the public key 207 be used in a signature operation to prove the ownership of the DID 205. Alternatively or in addition, the authentication information 211 may specify that the public key 207 be used in a biometric operation to prove ownership of the DID 205. Accordingly, the authentication information 211 may include any number of mechanisms by which the DID owner 201 is able to prove that the DID owner 201 owns the DID 205.

The DID document 210 may also include authorization information 212. The authorization information 212 may allow the DID owner 201 to authorize third party entities the rights to modify the DID document 210 or some part of the document without giving the third party the right to prove ownership of the DID 205. For example, the authorization information 212 may allow the third party to update any designated set of one or more fields in the DID document 210 using any designated update mechanism. Alternatively, the authorization information may allow the third party to limit the usages of DID 205 by the DID owner 201 for a specified time period. This may be useful when the DID owner 201 is a minor child and the third party is a parent or guardian of the child. The authorization information 212 may allow the parent or guardian to limit use of the DID 201 until such time as the child is no longer a minor.

The authorization information 212 may also specify one or more mechanisms that the third party will need to follow to prove they are authorized to modify the DID document 210. In some embodiments, these mechanism may be similar to those discussed previously with respect to the authentication information 211.

The DID document 210 may also include one or more service endpoints 213. A service endpoint may include a network address at which a service operates on behalf of the DID owner 201. Examples of specific services include discovery services, social networks, file storage services such as identity servers or hubs, and verifiable claim repository services. Accordingly, the service endpoints 213 operate as pointers for the services that operate on behalf of the DID owner 201. These pointers may be used by the DID owner 201 or by third party entities to access the services that operate on behalf of the DID owner 201. Specific examples of service endpoints 213 will be explained in more detail to follow.

The ID document 210 may further include identification information 214. The identification information 214 may include personally identifiable information such as the name, address, occupation, family members, age, hobbies, interests, or the like of DID owner 201. Accordingly, the identification information 214 listed in the DID document 210 may represent a different persona of the DID owner 201 for different purposes. For instance, a persona may be pseudo anonymous, e.g., the DID owner 201 may include a pen name in the DID document when identifying him or her as a writer posting articles on a blog; a persona may be fully anonymous, e.g., the DID owner 201 may only want to disclose his or her job title or other background data (e.g., a school teacher, an FBI agent, an adult older than 21 years old, etc.) but not his or her name in the DID document; and a persona may be specific to who the DID owner 201 is as an individual, e.g., the DID owner 201 may include information identifying him or her as a volunteer for a particular charity organization, an employee of a particular corporation, an award winner of a particular award, etc.

The DID document 210 may also include credential information 215, which may also be referred to herein as an attestation. The credential information 215 may be any information that is associated with the DID owner 201's background. For instance, the credential information 215 may be (but not limited to) a qualification, an achievement, a government ID, a government right such as a passport or a driver's license, a payment provider or bank account, a university degree or other educational history, employment status and history, or any other information about the DID owner 201's background.

The DID document 210 may also include various other information 216. In some embodiments, the other information 216 may include metadata specifying when the DID document 210 was created and/or when it was last modified. In other embodiments, the other information 216 may include cryptographic proofs of the integrity of the DID document 210. In still further embodiments, the other information 216 may include additional information that is either specified by the specific method implementing the DID document or desired by the DID owner 201.

FIG. 2 also illustrates a distributed ledger or blockchain 220. The distributed ledger 220 may be any decentralized, distributed network that includes various computing systems that are in communication with each other. For example, the distributed ledger 220 may include a first distributed computing system 230, a second distributed computing system 240, a third distributed computing system 250, and any number of additional distributed computing systems as illustrated by the ellipses 260. The distributed ledger or blockchain 220 may operate according to any known standards or methods for distributed ledgers. Examples of conventional distributed ledgers that may correspond to the distributed ledger or blockchain 220 include, but are not limited to, Bitcoin [BTC], Ethereum, and Litecoin.

In the context of DID 205, the distributed ledger or blockchain 220 is used to store a representation of the DID 205 that points to the DID document 210. In some embodiments, the DID document 210 may be stored on the actual distributed ledger. Alternatively, in other embodiments the DID document 210 may be stored in a data storage (not illustrated) that is associated with the distributed ledger or blockchain 220.

As mentioned, a representation of the DID 205 is stored on each distributed computing system of the distributed ledger or blockchain 220. For example, in FIG. 2 this is shown as the DID hash 231, DID hash 241, and DID hash 251, which are ideally identical copies of the same DID. The DID hash 231, DID hash 241, and DID hash 251 may then point to the location of the DID document 210. The distributed ledger or blockchain 220 may also store numerous other representations of other DIDs as illustrated by references 232, 233, 234, 242, 243, 244, 252, 253, and 254.

In one embodiment, when the DID user 201 creates the DID 205 and the associated DID document 210, the DID hash 231, DID hash 241, and DID hash 251 are written to the distributed ledger or blockchain 220. The distributed ledger or blockchain 220 thus records that the DID 205 now exists. Since the distributed ledger or blockchain 220 is decentralized, the DID 205 is not under the control of any entity outside of the DID owner 201. The DID hash 231, DID hash 241, and DID hash 251 may include, in addition to the pointer to the DID document 210, a record or time stamp that specifies when the DID 205 was created. At a later date when modifications are made to the DID document 210, this may also be recorded in DID hash 231, DID hash 241, and DID hash 251. The DID hash 231, DID hash 241, and DID hash 251 may further include a copy of the public key 207 so that the DID 205 is cryptographically bound to the DID document 210.

Figure 3:
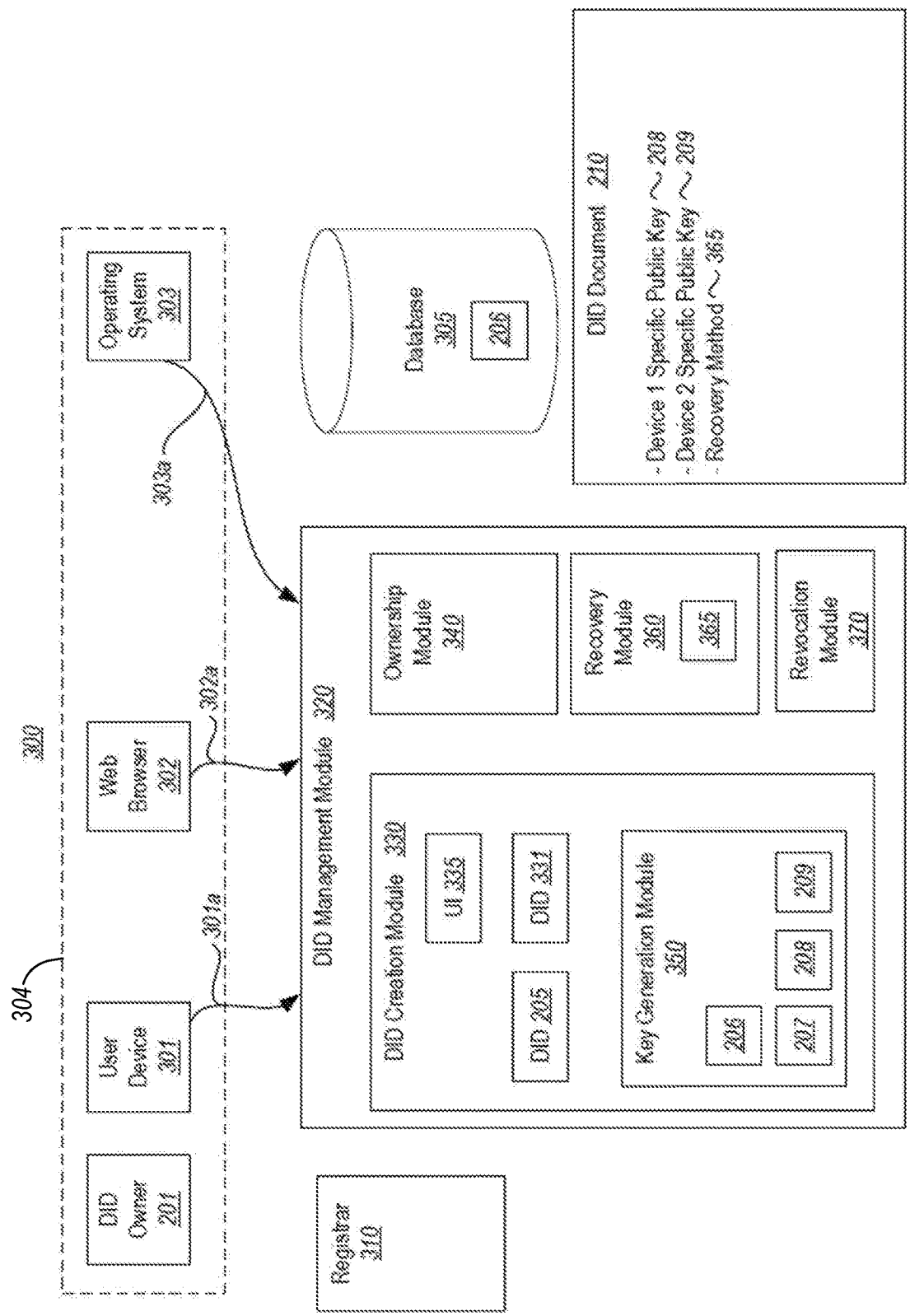
FIG. 3 illustrates an example environment for various DID management operations and services.

Having described DIDs and how they operate generally with reference to FIG. 2, specific embodiments of DIDs will now be explained. Turning to FIG. 3, an environment 300 that may be used to perform various DID lifecycle management operations and services will now be explained. It will be appreciated that the environment of FIG. 3 may reference elements from FIG. 2 as needed for ease of explanation.

As shown in FIG. 3, the environment 300 may include various devices and computing systems that may be owned or otherwise under the control of the DID owner 21. These may include a user device 301. The user device 301 may be, but is not limited to, a mobile device such as a smart phone, a computing device such as a laptop computer, or any device such as a car or an appliance that includes computing abilities. The device 301 may include a web browser 302 operating on the device and an operating system 303 operating the device. More broadly speaking, the dashed line 304 represents that all of these devices may be owned or otherwise under the control of the DID owner 201.

The environment 300 also includes a DID lifestyle management module 320. It will be noted that in operation, the DID lifecycle management module 320 may reside on and be executed by one or more of user device 301, web browser 302, and the operating system 303 as illustrated by the lines 301a, 302a, and 303a. Accordingly, DID lifecycle management module 320 is shown as being separate for ease of explanation.

As shown in FIG. 3, the DID lifecycle management module 320 includes a DID creation module 330. The DID creation module 330 may be used by the DID owner 201 to create the DID 205 or any number of additional DIDs, such as DID 331. In one embodiment, the DID creation module may include or otherwise have access to a User Interface (UI) element 335 that may guide the DID owner 201 in creating the DID 205. The DID creation module 330 may have one or more drivers that are configured to work with specific distributed ledgers such as distributed ledger 220 so that the DID 205 complies with the underlying methods of that distributed ledger.

A specific embodiment will now be described. For example, the UI 335 may provide a prompt for the user to enter a username or some other human recognizable name. This name may be used as a display name for the DID 205 that will be generated. As previously described, the DID 205 may be a long string of random numbers and letters and so having a human recognizable name for a display name be advantageous. The DID creation module 330 may then generate the DID 205. In the embodiments having the UI 335, the DID 205 may be shown in a listing of identities and may be associated with the human recognizable name.

The DID creation module may also include a key generation module 350. The key generation module may generate the private key 206 and public key 207 pair previously described. The DID creation module 330 may then use the DID 205 and the private and public key pair to generate the DID document 210.

In operation, the DID creation module 330 accesses a registrar 310 that is configured to the specific distributed ledger that will be recording the transactions related to the DID 205. The DID creation module 330 uses the registrar 310 to record the DID hash 231, DID hash 241, and DID hash 251 in the distributed ledger in the manner previously described and to store the DID document 210 in the manner previously described. This process may use the public key 207 in the has generation.

In some embodiments, the DID lifecycle management module 320 may include an ownership module 340. The ownership module 340 may provide mechanisms that ensure that the DID owner 201 is aware that the DID owner 201 is in sole control of the DID 205. In this way, the provider of the DID lifecycle management module 320 is able to ensure that the provider does not control the DID 205, but is only providing the management services.

As previously discussed, the key generation module 350 generates the private key 206 and public key 207 pair and the public key 207 is then recorded in the DID document 210. Accordingly, the public key 207 may be used by all devices associated with the DID owner 201 and all third parties that desire to provide services to the DID owner 201. Accordingly, when the DID owner 201 desires to associate a new device with the DID 205, the DID owner 201 may execute the DID creation module 330 on the new device. The DID creation module 330 may then use the registrar 310 to update the DID document 210 to reflect that the new device is now associated with the DID 205 and this would be reflected in an updated transaction on the distributed ledger 220 as previously described.

In some embodiments, however, it may be advantageous to have a public key per device 301 owned by the DID owner 201 as this may allow the DID owner 201 to sign with the specific device public key without having to access a general public key. In other words, since the DID owner 201 will use different devices at different times (for example using a mobile phone in one instance and then using a laptop computer in another instance) it is advantageous to have a key associated with each device to provide efficiencies in signing using the keys. Accordingly, in such embodiments the key generation module may generate additional public keys 208 and 209 when the additional devices execute the DID creation module 330. These additional public keys may be associated with private key 206 or in some instances may be paired with a new private key.

In those embodiments where the additional public keys 208 and 209 are associated with different devices, the additional public keys 208 and 209 may be recorded in the DID document 210 as being associated with those devices. This is shown in FIG. 3. It will be appreciated that the DID documents 210 may include the information previously described in relation to FIG. 2 in addition to the information shown in FIG. 3. If the DID document 210 existed prior to the device specific public keys being generated, then the DID document 210 would be updated by the creation module 330 via the registrar 310 and this would be reflected in an updated transaction on the distributed ledger 220.

In some embodiments, the DID owner 201 may desire to keep the association of a device with a public key or even with the DID 205 a secret. Accordingly, the DID creation module 330 may cause that such data be secretly shown in the DID document 210.

As described thus far, the DID 205 has been associated with all the devices under the control of the DID owner 201, even when the devices have their own public keys. However, in some embodiments it may be useful for each device or some subset of devices under the control of the DID owner 201 to each have their own DID. Thus, in some embodiments the DID creation module 330 may generate an additional DID, for example DID 331, for each device. The creation module would then generate private and public key pairs and DID documents for each of the devices and have them recorded on the distributed ledger 220 in the manner previously described. Such embodiments may be advantageous for devices that may change ownership as it may be possible to associate the specific device DID to the new owner of the device by granting the new owner authorization rights in the DID document and revoking such rights from the old owner.

As mentioned, the private key, to ensure that it is totally in the control of the DID owner 201, is created on the user device 301, browser 302, or operating system 303 owned or controlled by the DID owner 201 that executed the DID management module 320. In this way, there is little chance that a third party may gain control of the private key 206, especially the provider of the DID lifecycle management module 320. However, there is a chance that the device storing the private key 206 may be lost by the DID owner 201, which may cause the DID owner 201 to lose access to the DID 205. Accordingly, in some embodiments the UI 335 may include the option to allow the DID owner 201 to export the private key 206 to an off device secured database 305 that is under the control of the DID owner 201. In some embodiments, the private key 206 may be stored as a QR code that may scanned by the DID owner 201.

In other embodiments, the DID lifecycle management module 320 may include a recovery module 360 that may be used to recover a lost private key 206. In operation, the recovery module 360 allows the DID owner 201 to select one or more recovery mechanisms 365 at the time the DID 205 is created that may later be used to recover the lost private key. In those embodiments having the UI 335, the UI 335 may allow the DID owner 201 to provide required information that will be needed by the one or more recovery mechanisms 365 when the recovery mechanisms are implemented. The recovery module may then be run on any device associated with the DID 205.

The DID lifecycle management module 320 may also include a revocation module 370 that is used to revoke or sever a device from the DID 205. In operation, the revocation module may use the UI element 335, which may allow the DID owner 201 to indicate a desire to remove a device from being associated with the DID 205. In one embodiment, the revocation module may access the DID document 210 and may cause that all references to the device be removed from the DID document. Alternatively, the public key for the device may be removed. This change in the DID document 210 may then be reflected as an updated transaction on the distributed ledger 220 as previously described.

Applications using DIDs in a decentralized environment includes issuing and presenting verifiable claims that are associated with a DID. Asserting verifiable claims may be as simple as stating that you are more than 21 years old, you are authorized to drive, or stating that you have earned a university degree. These claims are verifiable by showing the relying entities an ID or a certificate that is issued by the claim issuing entity. For example, a driver's license may be used to prove that the license holder is capable of driving a motor vehicle, the same driver's license may also be used to prove that the license holder is more than 21 years old. As another example, a university diploma can be used to prove that one has graduated from the university and earned the university degree. These physical IDs and certificates can prove its authenticity because these IDs and certificates have its distinct look and very hard to fake. However, when two entities are communicating over a computer network, asserting verifiable claims is more complicated. DIDs provide a secure, private, and verifiable mechanism for user to assert these claims on a computer network or between computing devices.

Figure 4:
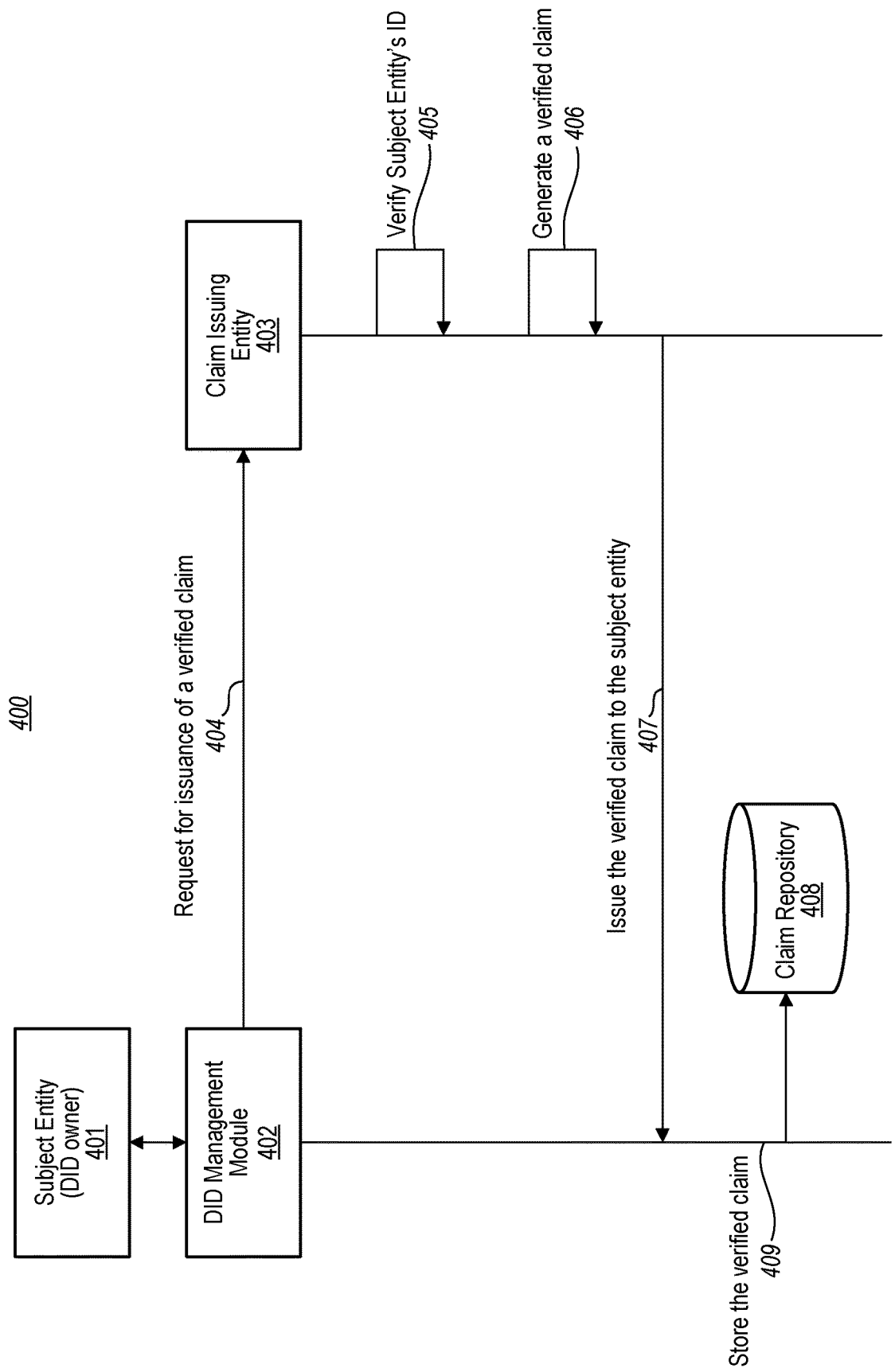
FIG. 4 illustrates an embodiment of an example environment in which a verified claim related to a DID owner may be issued.

FIG. 4 illustrates an example environment 400 in which a verified claim may be issued. As illustrated in FIG. 4, a subject entity 401 is a DID owner. The subject entity 401 may request for issuance of a verified claim from a claim issuing entity 403. Such a request may be sent by the subject entity 401's DID management module 402. The one-directional arrow 404 represent that the DID management module 402 sends the request to the claim issuing entity 403. The request includes at least the subject entity's identity information, e.g., the subject entity's DID. The claim issuing entity 403 receives the request from the DID management module 402 including at least the subject entity's DID. The request may also include what type of claim is being requested, what (type of) information is to be verified, and/or what type of information is requested to be included in the verified claim.

Based on the received request for issuance of a verified claim, the claim issuing entity 403 verifies the subject entity's identity. The verification process is completed on the claim issuing entity 403's side, which is represented by the loop arrow 405. This verification may be performed by comparing the received DID of the subject entity with data stored in a data storage. If some matching data associated with the received DID is found, the subject entity's DID is verified to be valid. Additionally, the information requested to be verified or the information requested to be included in the verified claim may further be verified based on the matching data associated with the DID. For example, if the subject entity 401 is a driver, and the claim issuing entity 403 is State A's DMV, the information requested to be included in the verified claim is that the driver is authorized to drive, the DMV will verify the data associated with the driver 401 at the DMV's computing system 403 and determine whether the driver 401 is authorized to drive. If the DMV's data shows that the driver 401 has a valid driver's license, which indicates that the driver is authorized to drive, the driver's identity is further verified.

If the subject entity's identity is verified, the claim issuing entity 403 generates a verified claim. The claim is generated by the claim issuing entity 403 at the claim issuing entity's computing system 403, which is represented by the one-directional arrow 406. The verified claim often includes a proof section to prove the claim's authenticity. The proof section often includes a signature generated by the claim issuing entity's secret private key.

After the verified claim is generated, it is then issued or sent to the subject entity 401 or subject entity's DID management module 402, which is represented by the one-directional arrow 407. After receiving the issued verified claim, the DID management module 402 may store the verified claim 409 in a storage (e.g., a claim repository storage 408), which is represented by the one-directional arrow 409. In some embodiments, the claim repository storage 408 may be part of the DID management module 402, or be a storage local to the DID management module 402. Alternatively, or in addition, the claim repository storage 408 may be a cloud storage that is associated with the DID of the subject entity.

The purpose of having a verified claim is that the subject entity 401 can prove his/her credential to a relying entity. Thus, eventually, the verified claim is caused to be sent to the relying entity. The verified claim may be sent to the relying entity directly from the claim issuing entity 403. Alternatively, or in addition, the verified claim may be sent to the relying entity from the DID management module 402 or from the claim repository 408. The verified claim may also be controlled by the subject entity 401 directly, and the subject entity 401 may determine how and to whom the verified claim will be sent. For example, the subject entity 401 (e.g., a driver) may send the verified claim to another entity (e.g., a rental car company) via email, SMS, print out paper, or other communication channels.

As briefly discussed above, the verified claim often has a proof section that includes a signature signed by the claim issuing entity's secret private key. After receiving the verified claim, the relying entity may decode the claim issuing entity's signature by using the claim issuing entity's public key. If the decrypted signature matches the information contained in the asserted claims, the verified claim is proved to be true and correct; on the other hand, if the decrypted signature does not match the information contained in the asserted claims, the claim may have been tampered or be false. As such, the subject entity 401 can prove his/her credentials to a relying entity without having to show his/her physical IDs or paperwork, or have a representative from the claim issuing entity 403 on the phone.

Further, the process of requesting and issuing a verified claim may be automatically done by the subject entity's DID management module and the claim issuing entity 403's computing systems. In some embodiments, the relying entity's computing system may generate a request for verification of the subject entity's credential and send the request to the subject entity's DID management module 402, and the subject entity's DID management module 402 then determines the relying entity's identity. If the relying entity's identity is verified to be a valid entity for requesting the subject entity's credential, the subject entity's DID management module 402 may then requests the claim issuing entity 403 to issue a verified claim, and have the issued verified claim be sent to the relying entity's computing system.

Figure 5:
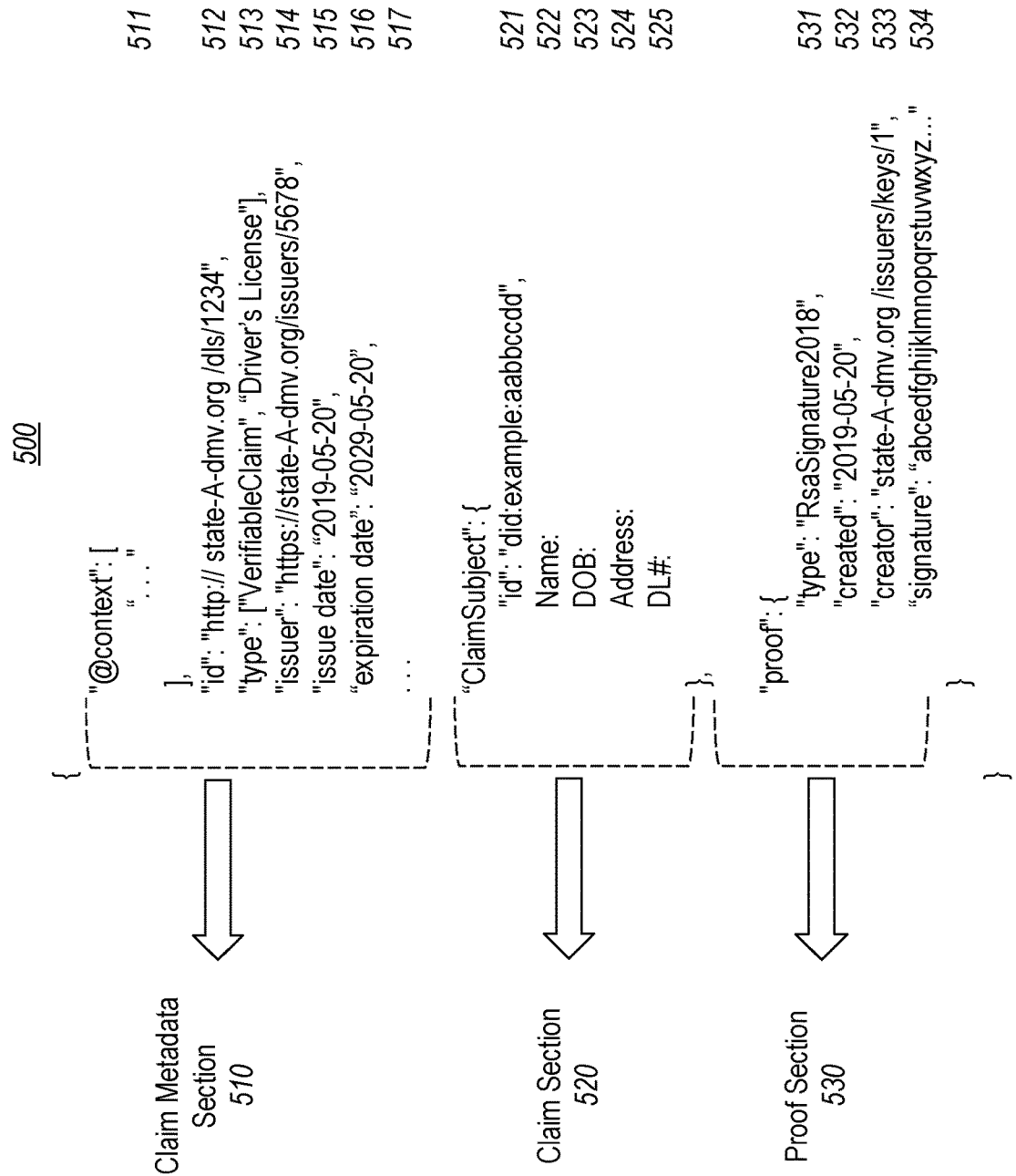
FIG. 5 illustrates an example verified claim.

FIG. 5 illustrates an example verified claim 500 that may be issued by a claim issuing entity. A verified claim 500 may be in JSON format. In some embodiment, the verified claim 500 may have three sections: (1) claim metadata section 510, (2) claim section 520, and (3) proof section 530. The claim metadata 510 is often used to describe the properties of the claim, such as the context 511, the identifier for the credential 512, the type of claim 513, the entity that issued the credential 514, the issuance date 515, and the expiration date 516. The context 511 field often includes links to one or more files that establish the special terms that may be used in the verified claim 500. The ellipsis 517 represents that there may be additional metadata included in the verified claim 500. For example, the claim metadata 510 may also include a public key (not shown) to use for verification purposes, a revocation mechanism, etc.

As illustrated in FIG. 5, the identity of the claim issuing entity 514 is State A's Department of Motor Vehicle (DMV). The type of the verified claim 513 is the subject entity's driver's license. The claim's issue date 515 is 2019-05-20, and the claim's expiration date 517 is 2029-05-20.

The verified claim 500 also includes one or more claims 520. The claim section 520 includes the subject entity's identifier (e.g., the DID of the subject entity 521) and the claims (e.g., credentials) that the subject entity is to assert. As illustrated in FIG. 5, the verified claim is the subject entity's driver's license 513, which includes the driver (i.e., the subject entity)'s name 522, the driver's date of birth 523, the driver's physical address 524, and the driver's driver license number 525.

Finally, the verified claim 500 also includes a proof section 530. The proof section 530 is the digital proof that makes the information included in the claim section 520 tamperproof. The proof section 530 often includes a digital signature 534, the cryptographic signature type 531 that was used to generate the signature 534, and the date 532 when the signature was created.

Many different embodiments may be implemented to generate the digital signature 534. As an example, in some embodiments, the content in the claim section 520 may be used to generate a hash, and the generated hash may then be encrypted using the claim issuing entity's private key to generate the digital signature 534. As such, when a relying entity receives the verified claim 500, the relying entity may decrypt the digital signature 534 using the claim issuing entity's public key 533, and recreate the hash using the content included in the claim section 520. The decrypted digital signature and the recreated hash are then compared. If the decrypted digital signature matches the hash of the claim section 520, the claim section 520 is authenticated to be true and not tampered with. On the other hand, if the decrypted digital signature does not match the hash of the claim section 520, the claim section 520 has either been tampered with or is false. As such, the relying entity can verify whether the claim was issued by the claim issuing entity and whether the claim is true and correct.

In addition to issuing and presenting verified claims that are associated to a permanent DID of a user (e.g., a DID associated with a user's driver's license), multiple DIDs may be issued for the same user. In some embodiments, a user can generate a new DID each time the user is to communicate or conduct business with a new relying entity, and have the claim issuing entity issue a new verified claim to be associated with the newly generated DID. As such, the relying entity will only see the newly generated DID and the newly issued claim, but not the permanent DID of the user. The DID that is generated only for the purpose of dealing with one relying entity may also be called a pairwise DID, because such a DID is generated to solely pair with the particular relying entity.

There are many different methods for generating additional DIDs or pairwise DIDs for a user. The simplest method is to generate random numbers, and use the generated random number as the new DID's private key, and then derive a public key from the randomly generated private key. The benefit of using randomly generated DIDs is that each DID of the same user is irrelevant, thus, one cannot recreate the user's other DIDs by knowing any other of the user's DIDs. However, each pairwise DID may often be used for each entity who the subject entity is communicating with or doing business with, or even for each transaction. As such, there may be a large number of DIDs that have been generated or that are to be generated for each user. Managing a large number of DIDs for a user may become difficult, if each of the DIDs is irrelevant to each other. Accordingly, it is advantageous to derive new DIDs from an existing DID. In particular, if a derived new DID is used to assert verified claims that are related to an existing DID's credentials, deriving the new DID using the existing DID is likely to simplify the DID management for the DID management module.

Figure 6:
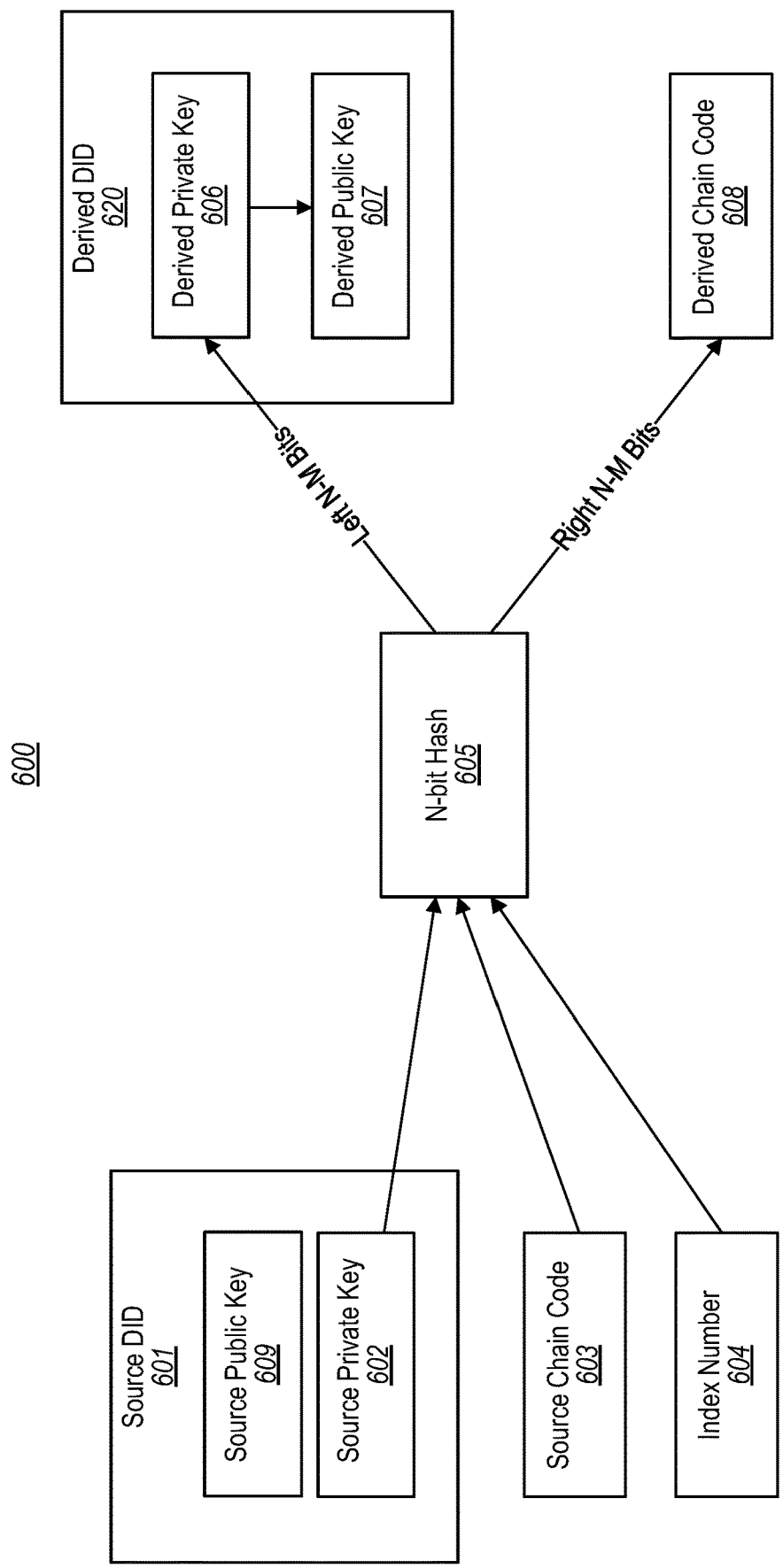
FIG. 6 illustrates an example embodiment of how a source DID may be used to generate a derived DID.

FIG. 6 illustrates an example embodiment in which a source DID may be used to derive one or more new DIDs (herein after also called derived DID(s)). The source DID 601 may be a DID similar to the DID 201 that includes a public key 609 and a private key 602. The chain code 603 may be generated from a same seed that was used to generate the source private key 602. In some embodiments, a one-way hash function may be used to generate the source private key 602 and/or the chain code 603. In some embodiments, the left M bits of the hash and the right N-M bits of the hash may simply be used as the source private key 602 and the chain code 603.

For example, N may be 512, and M may be 256. Accordingly, the hash is 512 bits long, and the 512 bit long hash is split into two 256-bit halves (because M is 256, and N-M is also 256). The left-half 256 bits of the hash may be used to generate the source private key 602. The right-half 256 bits of the hash may be used to generate the chain code 603. The source private key 602, the chain code 603 and an index number may then be used to generate a private key 606 of a derived DID 620.

As illustrated in FIG. 6, the source private key 602, the chain code 603 and the index number 604 may then be used as the inputs to produce another N-bit hash 605. Then, the left M bits of the N-bit hash 605 is used to generate the private key 606 of a derived DID. The private key 606 of the derived DID 620 may then be used to derive the public key 607 of the derived DID 620.

The index number 604 may be 0 or any natural number that is used to index the derived DIDs. Each time a new derived DID 620 is to be generated, the index number is increased by 1. For example, when a new relying entity requires the owner of the source DID to prove a particular credential, the owner of the source DID 601 or his/her DID management module may generate a new derived DID 620 (using a new index number). Thus, a user can have as many derived DIDs as necessary or desirable. Each time a new DID is needed, this process repeats, and a new DID is generated.

Each derived DID 620 can also be used as a source DID to generate additional DIDs. For example, the derived private key 607, the derived chain code 608 and an index number may be used to generate a new DID that is derived from the derived DID 620. This process can also repeat as many times as necessary or as the user desires.

In some embodiments, the source DID owner's DID management module 320 may be able to automatically generate such derived DIDs whenever a new derived DID is needed. In some embodiments, a separate service may be provided to a DID owner or the DID management module 320 to generate such derived DIDs.

This derived DID 620 may be used to assert a derived claim. A derived claim is a verified claim that only assert a portion of the information asserted in an existing claim (herein after also called a source claim). The source claim is associated with the source DID 601. The derived DID 620 may be used to communicate with a group of entities, e.g., all rental car companies. Alternatively, the derived DID 620 may be used solely to communicate with one particular relying entity, or one transaction.

For example, the source DID 601 may be associated with the driver's license of the user. The derived DID 620 may be used to assert that the user is older than 21 years old or is allowed to drive, which is a portion of the information included in the source claim (e.g., driver's license information) associated with the source DID 601.

Figure 7A:
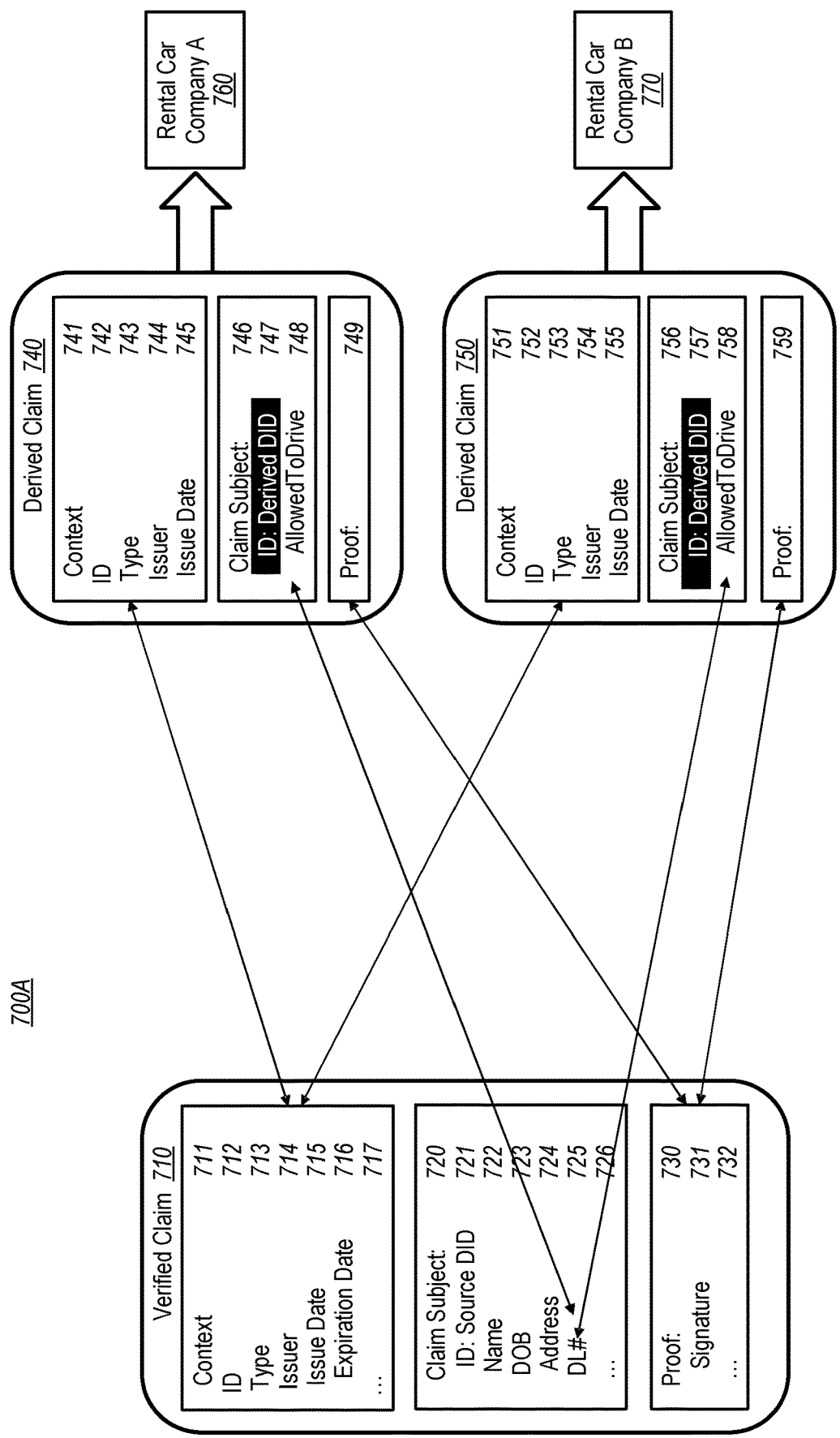
FIG. 7A illustrates an example embodiment, in which a derived claim may be generated from a source claim, the source claim being associated with a source DID, and the derived claim being associated with a derived DID.

FIG. 7A illustrates an example embodiment 700A, in which a derived claim 740 or 750 associated with a derived DID 747 or 757 may be issued based on a previously issued verified claim 710. Referring to FIG. 7A, the verified claim 710 may correspond to the example verified claim 500 of FIG. 5. The verified claim 710 includes metadata section including context 711, ID 712, type 713, issuer 714, issue date 715, and expiration date 716, each of which may correspond to the context 511, ID 512, type 513, issuer 514, issue date 515, and expiration date 516 of FIG. 5. The ellipsis 717 represents that there may be additional metadata included in the verified claim 710. The claim subject 720 may also be similar to the claim subject 520. As illustrated, the verified claim 710 may be directed to the driver license of the owner of the source DID 721. The claim subject 720 includes all the information related to the driver license, such as ID 721, name 722, DOB 723, address 724, and DL #725, each of which may correspond to the ID 521, name 522, DOB 523, address 524, and DL #525 of FIG. 5. The proof 730 includes signature 731 and additional information (represented by the ellipsis 732) which may correspond to each field illustrated in the proof section 530 of FIG. 5.

However, the driver's license includes a lot of personally identifiable information that the owner of the source DID 721 may not want to disclose to a relying entity at all time. Also, in many situations, the relying entity may not need to know all the information included on the driver's license. For example, when the owner of the source DID 721 is trying to rent a car from the rental car company A 760, the rental car agency may only need to know that the customer is authorized to drive. In such a case, the owner of the source DID may generate a derived DID 747 that is used solely for the purpose of communicating with the rental car company A 760. The derived DID 747 may be used to issue a derived claim 740. The derived claim 740 may only include a portion of the information included in the verified claim 710 that is directed to the driver's license of the owner of the source DID 721.

Referring back to FIG. 4, for issuing a derived claim 740, the subject entity's DID management module 402 may first send a request for issuance of a derived claim to the claim issuing entity 403. The request may include the source DID and the derived DID. The source DID may be associated with a previously issued claim by the claim issuing entity 403. For example, the claim issuing entity 403 may be State A's DMV, and the source DID may be associated with the driver license issued by State A's DMV. The claim issuing entity (e.g., State A's DMV) verifies the identity of the subject entity via the source DID, and then based on the request from the subject entity to issue a derived claim including the derived DID.

For example, the request from the subject entity may include information indicating that the derived claim should only include whether the owner of the derived DID is allowed to drive, but nothing else. Based on the information included in the request, the claim issuing entity 403 (e.g., State A's DMV) may issue a claim 740 including the derived DID 747, and the derived claim 747 only asserts whether the owner of the derived DID 747 is allowed to drive 748.

Since this is the only information that the rental car company A 760 needs to know, the owner of the source DID does not even need to disclose his/her name, date of birth, and/or physical address to the rental car company A 760. Even though the derived claim 740 may only include a portion of the information included in the verified claim 710, the derived claim 740 still can be authenticated based on the information provided in the proof section 749. The proof section 749 of the derived claim 740 may also include a proof section for the relying entity to verify the authentication of the derived claim 740. The proof section may include a signature signed by the claim issuing entity 744 (e.g., the State A's DMV). As such, the rental car company A 760 can verify that the derived claim 740 is true and correct, i.e., the owner of the derived DID 747 is allowed to drive. At the same time, the rental car company A 760 still does not know the driver's other personal information, e.g., how old the driver is, or even the name of the driver. Thus, the driver's (the owner of the source DID 721) privacy is protected from the relying entities by the use of the derived claim 740 and the derived DID 747.

Furthermore, since the derived DID 747 may be a pairwise DID that is intended to be solely used for communicating with the rental car company A 760, or be solely used for a single rental transaction, the rental car company A 760 not only cannot correlate information obtained from the derived DID 747 with other rental car company's data, but also cannot find out whether the owner of the derived DID 747 has rented car with them before without the DID owner's consent.

As another example, at a different time and location, the owner of the source DID may want to rent a car from a different rental car company B 770. A new derived DID 757 may be generated from the source DID 721. Similarly, a new derived claim 750 is generated to include the similar metadata information 751 through 755, and similar claims 758 as those recited in the derived claim 740. The new derived claim 750 may also be signed by the State A's DMV, which is the same claim issuing entity. However, since each of the derived claims 740 and 750 does not include personally identifiable information, even though the claims are identical, it is very difficult for the two rental car companies A and B 760, 770 to find out whether the two derived DIDs 747 and 757 belong to the same driver.

The embodiments described above allows a person to present derived claims using derived DIDs to one or more relying entities, so that the personally identifiable information of the person is protected from the relying entity. However, the claim issuing entity (e.g., State A's DMV) may still know that each of the derived DIDs 747, 757 belongs to the same person (i.e., the owner of the source DID 721), because each time a derived claim is to be issued, the subject entity must send the source DID 721 to the claim issuing entity (e.g., State A's DMV) to verify the identity of the subject entity, and also request the claim issuing entity to include the derived DID 747 or 757 into a derived claim 740 or 750. Especially in a decentralized environment, the DIDs are often propagated into metadata and/or the blockchains, when the claim issuing entity knows the different derived DIDs, the claim issuing entity may be able to correlate different activities involved by different derived DIDs based on the records propagated into the blockchains or other metadata.

To further protect the privacy of the subject entity from the claim issuing entities, the principles described herein further disclose embodiments that do not require the derived DIDs to be sent and/or included in the derived claims. The details of such embodiments are described with respect to FIG. 7B below.

Figure 7B:
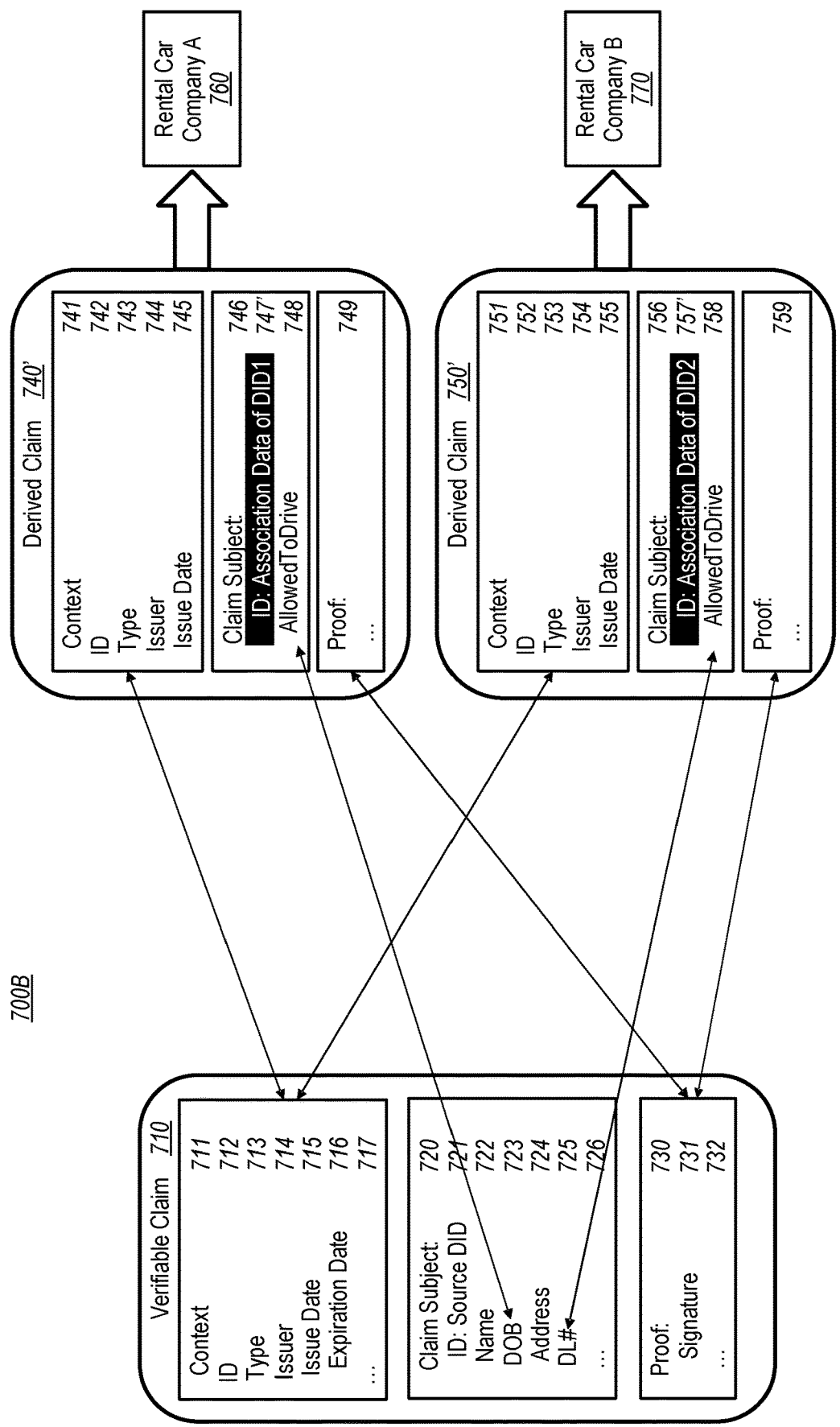
FIG. 7B illustrates an example embodiment, in which a derived claim may be generated using an association data structure, the association data structure corresponding to a derived DID.

FIG. 7B illustrates an example embodiment 700B in which the derived DIDs 747 and 757 are not provided to the claim issuing entity or included in the derived claims 740' and 750'. Instead an association data structure 747' or 757' of the derived DIDs 747 and 757 may be provided to the claim issuing entity. The association data structure 747' or 757' is caused to be included in the derived claims 740' and 750'. Each of the association data structures 747' and 757' is related to the corresponding derived DID, which may be verified by the relying entities (e.g., the rental car company A 760 or B 770), but the claim issuing entity (e.g., State A's DMV) may not be able to reconstruct the derived DID from the association data structures 747' and 757'.

As described above, unlike the embodiment, in which the subject entity sends the derived DID to the claim issuing entity each time a derived claim is requested to be issued, in this embodiment, only the association data structure 747' or 757' is sent to the claim issuing entity. As such, claim issuing entity will not have the knowledge of the relationship between the source DID and the derived DID.

Figure 8:
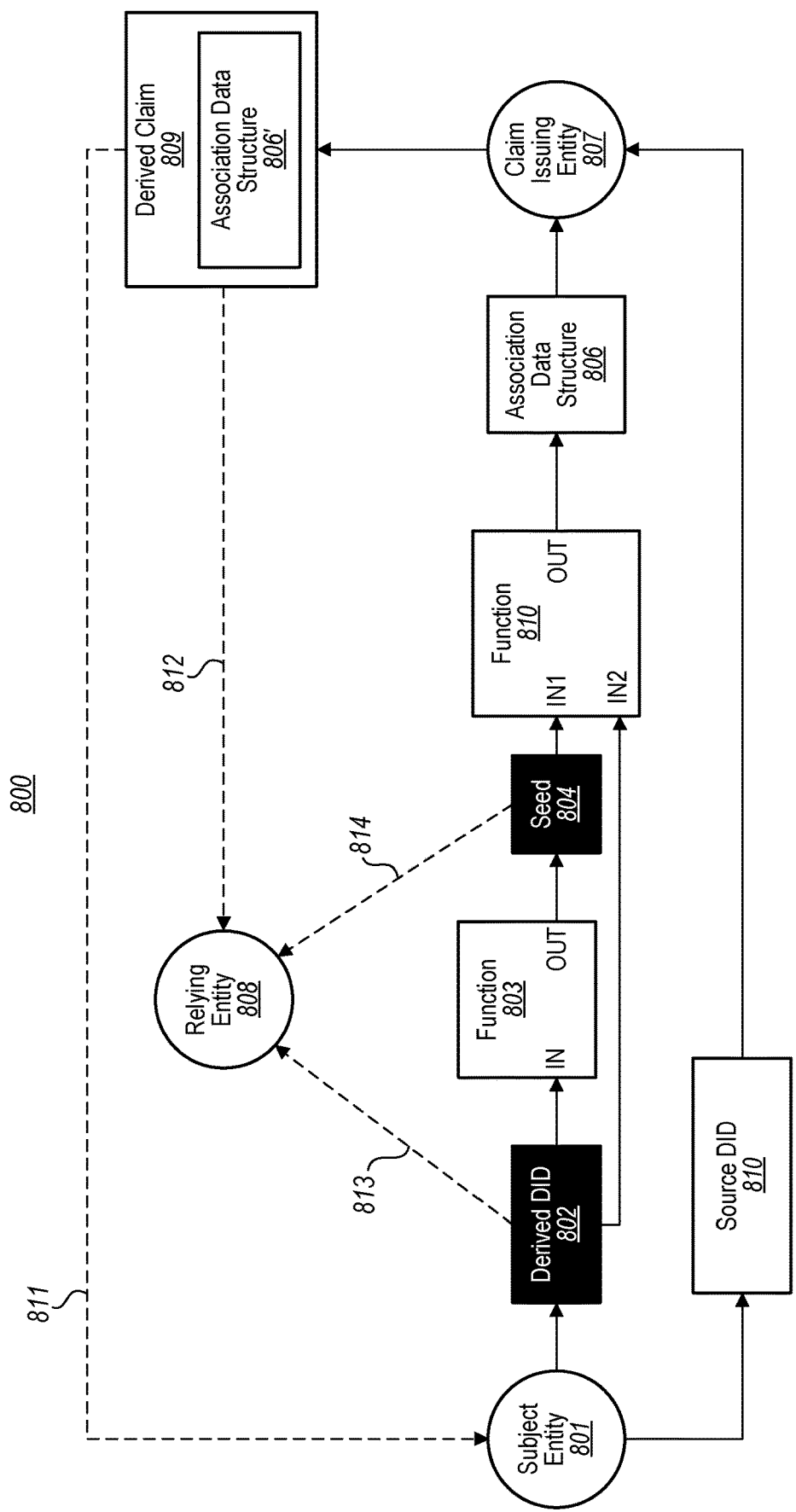
FIG. 8 illustrates a diagram illustrating an example embodiment of how an association data structure may be generated.

Different embodiments may be implemented by an owner of the source DID or the DID management module to generate association data structures. FIG. 8 illustrates an example embodiment 800, in which an association data structure 806 may be generated. The generated association data structure 806 is then provided to a claim issuing entity 805. The claim issuing entity 805 is then caused to generate a derived claim 809 including the association data structure. The verified claim 809 is then caused to be sent to the relying entity 808. The relying entity 808 is capable of verify whether the claim 809 is true and correct.

Referring to FIG. 8, each of the entities (including the subject entity 801, the claim issuing entity 807, and the relying entity 808) are represented by a circle. Each of these entities 801, 805 and 808 may be a computing system that is associated with and/or controlled by the respective physical entity. For example, the subject entity 801 may be the DID owner's personal computer, mobile device, a web browser and/or a DID management module 320 installed on the DID owner's computer or mobile device. The claim issuing entity 805 may correspond to the claim issuing entity 714 of FIG. 7B. For example, the claim issuing entity 807 may be State A's DMV's computing system. The relying entity 808 may correspond to the rental car company A's computing system 760 of FIG. 7B. The DID owner may be a driver, who is trying to rent a car from the rental car company A 760. Before the rental car company 760 gives a rental car to the driver, the rental car company 760 may want to verify whether the driver is authorized to drive.

As illustrated in FIG. 8, the subject entity 801 (e.g., the driver's DID management module) first generates a derived DID 802. The derived DID 802 may be intended to be used solely for communicating with the rental car company A 760. The derived DID 802 is then fed into a function 803 as an input to generate an output. The output is a seed 804. Different functions may be implemented here as the function 803, as long as the seed created by the function 803 is at least resistant against dictionary attacks.

The seed 804 and the derived DID 802 are then fed into a function 805 as two inputs to generate an output. The output may then be used as the association data structure 806. As an example, the function 805 may be a function or algorithm used to generate a message authentication code (MAC). MAC algorithms can be constructed from different cryptographic primitives, such as cryptographic hash functions or from different block cipher algorithms. One particular type of MAC is called keyed-hash message authentication code (HMAC), which is generated using a cryptographic hash function and a secrete cryptographic key. An HMAC is generated using a secret key and a message. Here, the seed 804 may be used as the secret key input, and the derived DID may be used as the message input. The seed and the derived DID are then used to derive one or more codes. The one or more derived codes are then hashed via a predetermined hash function one or more times.

The function 805 used to generate the association data structure 806 (e.g., HMAC) is a one-way function, such that the entity receiving the association data structure 806 cannot reversely find out what the derived DID 802 and/or the seed 804 are. Further, the more complex the function 805 is, the generated association data structure 806 is likely to be more secure. On the other hand, the function 805 is deterministic, so that as long as the two inputs are the same, the output is always the same. This is important because as long as a relying entity 808 has the derived DID 802 and the seed 804, the relying entity 808 can verify whether the association data structure 806 is associated with the derived DID 802.

Once the association data structure 806 is generated, the generated association data structure 806 is sent to the claim issuing entity 807 to request the claim issuing entity 807 to issue a derived claim including the association data structure 806. The process of issuing a derived claim 809 may be similar to that illustrated with respect to FIG. 4. The subject entity 801 may correspond to the subject entity 402 and/or the DID management module 402 of FIG. 4; the claim issuing entity 807 may correspond to the claim issuing entity 403 of FIG. 4.

First, the subject entity 801 may send a request for issuance of a verified (derived) claim to the claim issuing entity 807. The request may state what types of verified claim is to be included in the derived claim, e.g., a claim asserting whether the derived DID owner is allowed to drive. At the same time, the source DID 810 is likely to be sent to the claim issuing entity 807 with the request, so that the claim issuing entity 807 can verify the identity of the subject entity 801. After the claim issuing entity 807 verifies the requesting party's identity (e.g., the driver, the owner of the source DID), the claim issuing entity 807 generates a derived claim 809 and places the association data structure 806' in the derived claim 809. The derived claim 809 with the association data structure 806' may include a proof section (similar to the proof section 530 of FIG. 5), so that the claims contained in the derived claim 809 can be verified as true and correct.

The derived claim 809 may be sent directly to the relying party 808 from the claim issuing entity 807, which is represented by the one-directional arrow 812. However, to further preserve the privacy of the subject entity 801, and not to have the claim issuing entity 807 to know who the subject entity 801 has done business with, the derived claim 809 should first be sent to the subject entity 801 (represented by the one directional arrow 811), and the subject entity 801 may then send the received derived claim 809 to the relying entity 808. At substantially the same time, the subject entity 801 will also send the derived DID 802 and the seed 804 to the relying entity 808 (represented by the one-directional arrow 813 and 814), so that the relying entity 808 can verify that the association data structure 806' included in the derived claim 809 is associated to the derived DID 802. The arrows 811 through 814 are drawn by dotted lines, which represent that these communications are not related to generating the derived claim 809. Instead, the communications represented by the dotted lines is likely to occur after the derived claim 809 is generated. The arrows drawn by solid lines represent that these actions are performed to cause the derived claim 809 to be generated.

FIG. 9 further illustrates an example claim 900 that includes the association data structure, but not the derived DID. The example claim 900 has a similar format as the example claim 500 of FIG. 5. The claim 900 may be a derived claim that is derived from the claim 500 of FIG. 5. The derived claim 900 may also include three sections: (i) claim metadata section 910, (ii) claim section 920, and (iii) proof(s) section 930. The claim metadata section 910 may include metadata related to context 911, id 912, type 913, issuer 914, issue date 915, expiration date 917, each of which corresponds to the respective fields 511 through 515 of FIG. 5. Further, the proof section 930 may include information used to authenticate the asserted claims 920, such as type 931, created 932, creator 933, and signature 934, each of which may also correspond to the respective fields 531 through 534.

However, unlike the claim section 520 of FIG. 5, the claim section 920 does not include the DID of the subject entity. Instead, the ID field includes association data structure that is associated with a DID. More than one association data structures may be included in the claim section 920. As illustrated in FIG. 9, there are two association data structures 921, 922 that are included in the claim section 920. The ellipsis 923 represents that there may be any nature number of association data structures included in the claim section 920.

Each of the association data structures 921 and 922 is associated with a different DID. For example, the association data structure 921 is associated with a first DID (i.e., DID1), and the association data structure 922 is associated with a second DID (i.e. DID2). Each of the DID1 and DID 2 may be a derived DID (derived from the DID 521 of FIG. 5). Since the association data structure 922 is encoded via one or more one-way functions, merely having the association data structures 921, 922 does not allow any entity (including the claim issuing entity) to find out what the underlying DIDs are. Also, giving a first entity the seed and the first derived DID1 only allows the first entity to verify the first derived DID1 921. The first entity still does not know what the second derived DID2 922 is.

For example, a subject entity may be shopping for a rental car company. The driver would like to inquiry the price from each of the rental car company A 760 and the rental car company B 770. However, each of the rental car companies A and B 760 and 770 would like to verify that the subject entity is allowed to drive before sending the subject entity a quote.

The subject entity in such a situation may generate two derived DIDs (i.e., derived DID1 and derived DID2). The subject entity may then generate a seed for each of these derived DIDs, and then generate an association data structure for each of the derived DIDs. The subject entity may then send both of the association data structures to the claim issuing entity (e.g., DMV), and request the claim issuing entity to include both of the association data structures into one derived claim. Thereafter, the claim issuing entity verifies the identity of the subject entity and issues the claim 900 that includes two association data structures 921 and 922, each of which is associated with a different derived DID.

As such, the claim issuing entity (e.g., DMV) only knows that the issued derived claim is used by the subject entity with two different DIDs, but does not know what the two different DIDs are. Thus, the principles described herein provides the subject entities additional privacy by encoding derived DIDs into association data structure, and only providing the association data structure to the claim issuing entity. Since claim issuing entity does not know and cannot find out what the derived DIDs are, they cannot correlate activities related to the different derived DIDs. Similarly, the different relying entities (e.g., rental car companies A and B) also do not know the other derived DIDs that are associated with the same claim, such that the rental car company A cannot retrieve the subject entity's activities related to rental car company B, and vise versa.

Furthermore, additional proof section 940 may be included in the derived 900. For example, the additional proof section 940 may include signatures signed by the subject entity. Alternatively, or in addition, the additional proof section 940 may include information for the relying entity to verify the association data structure 921 or 922. For example, if the verified claim 900 is sent to the rental car company A, who is dealing with the subject entity's first derived DID1, an additional proof section 940 may include the first derived DID1, the seed generated from the derived DID1, and the function used to generate the association data structure 806 (e.g. HMAC). After receiving the derived claim 900, the rental car company A (or its computer system) will use the information contained in the first proof(s) section 930 to verify whether the claims are true and correct and issued by the claim issuing entity (e.g., DMV). Further, the rental car company A will use the information contained in the second proof section 940 to verify whether the association data structure 921 is associated with the first derived DID1.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 10:
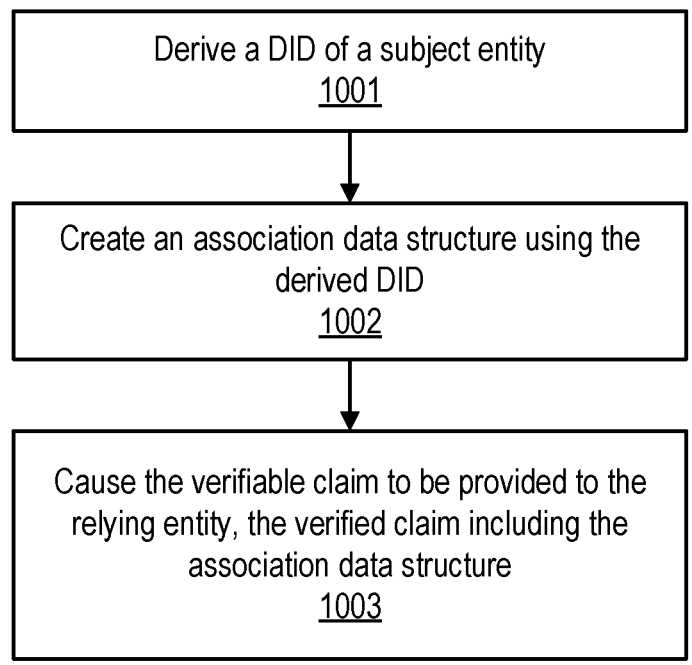
FIG. 10 illustrates a flowchart of an example method for using an association data structure corresponding to a derived decentralized identifier of a subject entity to share a verified claim about the subject entity to one or more relying entities.

FIG. 10 illustrates a flowchart of an example method 1000 for using an association data structure corresponding to a derived decentralized identifier of a subject entity to share a verified claim about the subject entity to one or more relying entities. The method 1000 includes deriving a DID of a subject entity (act 1001). The derived DID may be derived using an existing source DID. The details of deriving a new DID from an existing DID is described above with respect to FIG. 6.

The method 1000 also includes creating an association data structure using the derived DID (act 1002). Many different embodiments may be implemented to generate the association data structure. One example of how the association data structure may be generated is described above with respect to FIG. 8.

After the association data structure is generated, the verifiable claim is caused to be provided to the relying entity (act 1003). The verified claim includes the association data structure. FIGS. 8 and 9 illustrate an example embodiment of how the verified derived claim 809 that includes the association data structure is caused to be provided to the relying entity 808. Referring back to FIGS. 8 and 9, the verified derived claim 809 may look similar to the example claim 900. The claim issuing entity 807 receives the association data structure 806 and include the association data structure 806 into the derived claim 809. The derived claim 809 may then be sent to the relying entity 808 directly from the claim issuing entity 807. Alternatively, the derived claim 809 may first be sent to the subject entity 801, and the subject entity 801 then sends the received derived claim 809 to the relying entity 808.

Figure 11:
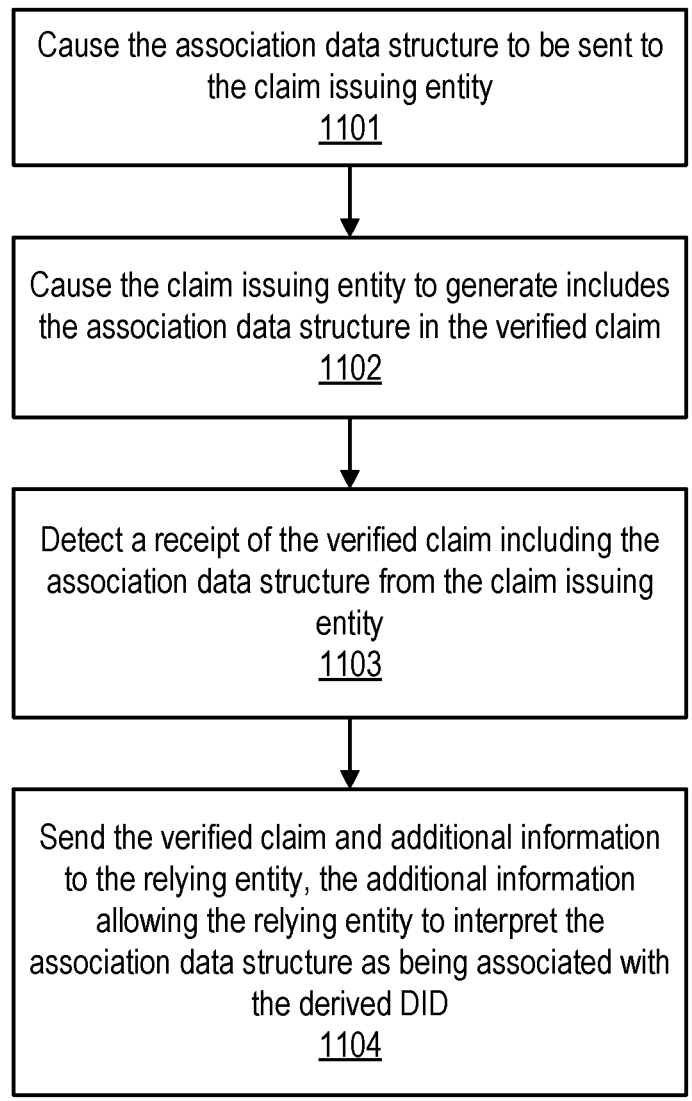
FIG. 11 illustrates a flowchart of an example method for causing the verifiable claim to be provided to the relying entity.

FIG. 11 illustrates a flowchart of an example method 1100 for causing the verified claim to be sent to the relying entity, which may correspond to the act 1003 of method 1000. The method 1100 includes first causing the association data structure to be sent to the claim issuing entity (act 1101). As illustrated in FIG. 8, after the association data structure 806 is generated, the association data structure 806 is sent to the claim issuing entity 807.

After the claim issuing entity 807 receives the association data structure 806, the claim issuing entity 807 is caused to include the association data structure in the verified claim (act 1102). Again, as illustrated in FIG. 8, including the association data structure in the verified claim may be performed by the claim issuing entity 807. The claim issuing entity 807 may generate a derived claim 809 that includes the association data structure 806'.

The verified claim (e.g., derived claim 809) may then be sent to the subject entity 801 (act 1103). The subject entity 801's receipt of the verified claim 809 may then be detected (act 1103). After the detection of the receipt of the verified claim 809, the verified claim may then be caused to be sent to the relying entity 808 (act 1104).

The subject entity 801 may be a DID management module 402 of the derived DID 802. Referring back to FIG. 4, after the DID management module 402 receives the verified claim 407, the DID management module 402 may store the verified claim in a claim repository 408. In some embodiments, the claim repository 408 may be caused to send the verified claim 407 to the relying entity 808. In some embodiments, the DID management module 402 may be caused to send the verified claim 407 to the relying entity 808 directly before storing the verified claim anywhere. In some embodiments, the claim issuing entity 807 may be caused to send the verified claim directly to the relying entity 808 directly.

Figure 12:
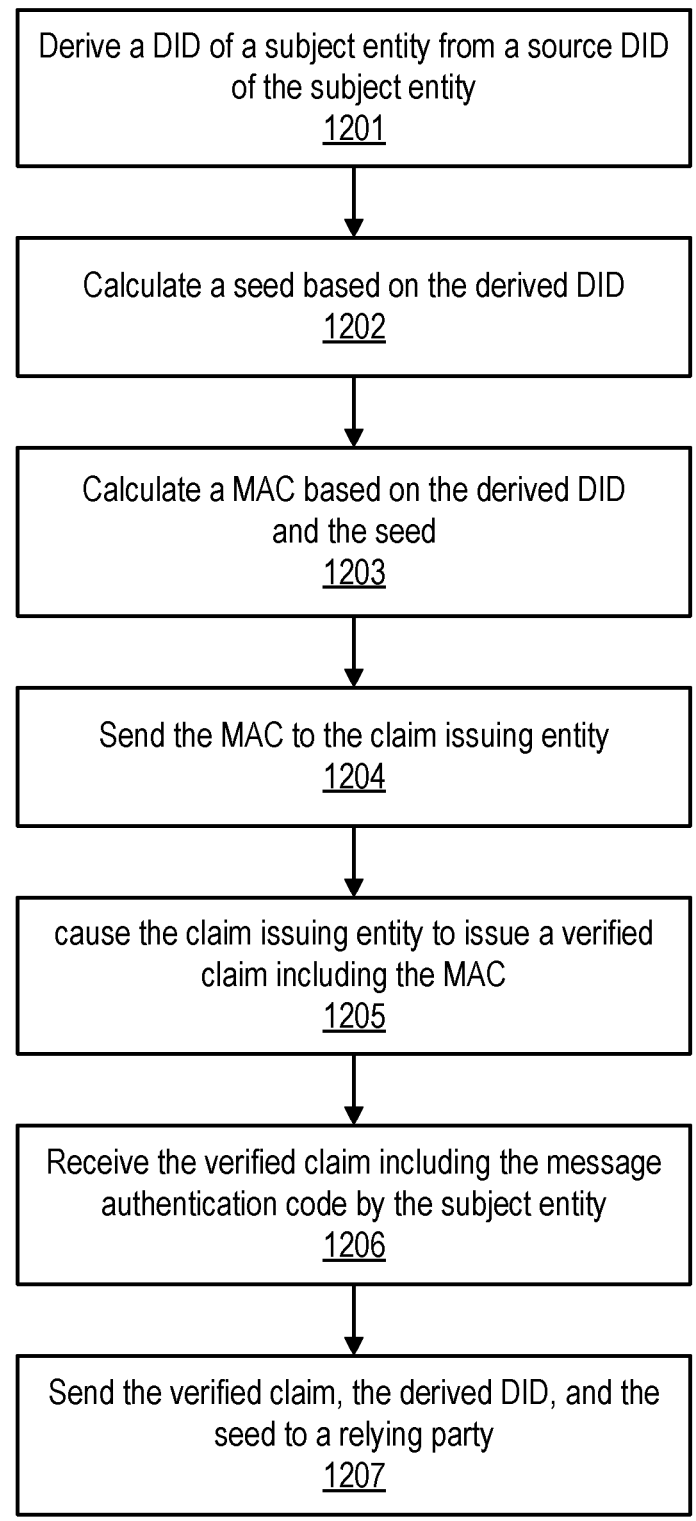
FIG. 12 illustrates a flowchart of an example method for using a message authentication code corresponding to a derived decentralized identifier of a subject entity to share a verified claim about the subject entity to one or more relying entities.

FIG. 12 illustrates a flowchart of an example method 1200 for using a message authentication code (MAC) corresponding to a derived decentralized identifier of a subject entity to share a verified claim about the subject entity to one or more relying entities. As described with respect to FIG. 8, a MAC is an example association data structure that may be used to generate the privacy preserving verified claims.

The method 1200 includes deriving a DID of a subject entity from a source DID of the subject entity (act 1201). There are many different ways of deriving a DID for a subject entity. Using a source DID to derive a new DID is an example method for deriving a new DID. The details of how a new DID may be derived from a source DID are described above with respect to FIG. 6. There are many benefits of using an existing DID as a source DID to derive a new DID. For example, it is easier to manage multiple linked DIDs than managing multiple unrelated DIDs. The derived DID may be generated using a one-way deterministic hash function, such that the derived DID can be recreated if necessary. Also, the derived DID may be used to assert claims that are related to the claims related to the source DID.

The method 1200 also includes calculating a seed based on the derived DID (act 1202). As described with respect to FIG. 8, the seed 804 may be generated from a one-way function 803. The function 803 may be a hash function, or any function that is configured to generate a seed 804, as long as the generated seed 804 is at least resistant against dictionary attacks.

Based on the generated seed 803 and the derived DID 802, a message authentication code (MAC) may be generated (act 1203). The MAC may be generated using a keyed-hash algorithm, which uses a cryptographic hash function and a secrete cryptographic key. The seed 803 may be used as the secrete cryptographic key input, and the derived DID 802 may be used as the message input to generate a hash. The generated hash may be used as a message input again to generate a next hash. This process can repeat as many time as desired to generate a secure MAC.

This secure MAC is then send to the claim issuing entity (act 1204). The subject entity 801 may also send the source DID and other additional information to the claim issuing entity 807 with the MAC, such that the claim issuing entity 807 can verify the identity of the subject entity 801 and know what type of claims the subject entity needs.

After the entity of the subject entity 801 is verified, the claim issuing entity 807 is caused to issue a verified claim including the MAC (1205). The details of issuing a verified claim including an association data structure (e.g., MAC) are described above with respect to FIGS. 8 and 9. As illustrated in FIG. 9, the association data structure (e.g., MAC) may be included in the ID field of the verified claim 900, and more than one association data structure (e.g., MAC) may be included in the verified claim 900.

The verified claim 900 may then be sent to the subject entity 801, and the subject entity 801 may receive the verified claim 900 from the claim issuing entity 807 (act 1206). The received verified claim 900 may then be sent to one or more relying entities (act 1207). At substantially the same time, the subject entity 801 may also send the seed 804 and the derived DID 802 to the relying entity 808, such that the relying entity 808 may verify that the verified claim 900 is associated with the derived DID. Also, since the MAC is generated via a one-way cryptographic function, the claim issuing entity 807 cannot reversely find out what the derived DID is based on the MAC. Therefore, the privacy of the subject entity is not only protected from the relying entity, but also protected from the claim issuing entities.

For the processes and methods disclosed herein, the operations performed in the processes and methods may be implemented in differing order. Furthermore, the outlined operations are only provided as examples, an some of the operations may be optional, combined into fewer steps and operations, supplemented with further operations, or expanded into additional operations without detracting from the essence of the disclosed embodiments.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computing system, comprising:
   one or more processors; and
   one or more computer-readable storage devices having computer-executable instructions that are executable by the one or more processors to configure the computing system to perform a method for using an association data structure corresponding to a derived decentralized identifier of a subject entity to share a verified claim about the subject entity to one or more relying entities, the method comprising:
      deriving the decentralized identifier of a subject entity;
      creating an association data structure using the derived decentralized identifier, the association data structure including a message authentication code and being structured to be interpretable by a relying entity as demonstrating that a verified claim is about the derived decentralized identity; and
      causing the verified claim about the subject entity to be provided to the relying entity, the verified claim including the created association data structure.

2. The computing system of claim 1, wherein the verified claim is provided by a claim issuing entity, which is neither the subject entity nor the relying entity.

3. The computing system of claim 2, wherein the derived decentralized identifier of the subject entity is derived from an existing source decentralized identifier, and the source decentralized identifier is associated with a previously issued verified claim issued by the claim issuing entity.

4. The computing system of claim 3, wherein the association data structure is generated by a one-way encoding, such that the claim issuing entity cannot reconstruct the derived decentralized identifier from the association data structure.

5. The computing system of claim 2, wherein the causing to be provided to the relying entity the verified claim about the subject entity comprises:
   causing to be sent the association data structure to the claim issuing entity;
   causing the claim issuing entity to include the association data structure into the verified claim;
   detecting a receipt of the verified claim including the association data structure from the claim issuing entity; and
   sending the verified claim including the association data structure to the relying entity.

6. The computing system of claim 2, wherein the verified claim includes a first signature that is generated by the claim issuing entity, the first signature being used to authenticate that the verified claim was authorized by the claim issuing entity.

7. The computing system of claim 6, wherein the verified claim further includes a second signature that is generated by the derived decentralized identifier, the second signature being used to authenticate that the verified claim was authorized by the derived decentralized identifier.

8. The computing system of claim 2, the method further comprising:
   deriving a second decentralized identifier of a subject entity from a source decentralized identity of the subject entity;
   creating a second association data structure using the derived second decentralized identifier, the second association data structure being structured to be interpretable by a second relying entity as demonstrating that the same verified claim is about the derived second decentralized identity, the same verified claim being provided by the same claim issuing entity.

9. The computing system of claim 8, the method further comprising:
   sending the second association data structure to the same claim issuing entity to cause the same claim issuing entity to include the second association data structure into the verified claim.

10. The computing system of claim 9, the method further comprising:
    receiving the verified claim including both the first and second association data structure; and
    sending the received verified claim to the second relying entity.

11. The computing system of claim 10, wherein the sending the received verified claim to the second relying entity further includes sending additional information to the second relying entity, the additional information allowing the second relying entity to interpret the second association data structure as being associated with the derived second decentralized identifier.

12. A method implemented by a computing system in a decentralized network for using an association data structure corresponding to a derived decentralized identifier of a subject entity to share a verified claim about the subject entity to one or more relying entities, the method comprising:
    generating a derived decentralized identifier of a subject entity from a source decentralized identity of the subject entity, the source decentralized identity including a source private key and the derived decentralized identifier including a derived private key that is derived from the source private key;
    creating the association data structure using the derived decentralized identifier, the association data structure being structured to be interpretable by a relying entity as demonstrating that a verified claim is about the derived decentralized identity, the association data structure being created by applying the derived decentralized identifier to a first function as first input to generate a seed as first output from the first function and then applying the seed and the derived decentralized identifier to a second function as second input to generate the association data structure as second output from the second function; and causing the verified claim about the subject entity to be provided to the relying entity, the verified claim including the created association data structure.

13. The method of claim 12, wherein the association data structure includes a message authentication code.

14. The method of claim 13, wherein the message authentication code is generated from a seed that is generated using the derived decentralized identifier.

15. The computing system of claim 14, wherein the seed and the derived decentralized identifier are sent to the relying entity as additional information, such that the relying entity is able to verify that the message authentication code corresponds to the derived decentralized identifier.

16. The method of claim 12, wherein the verified claim is provided by a claim issuing entity, which is neither the subject entity nor the relying entity.

17. The method of claim 12, wherein the causing to be provided to the relying entity the verified claim about the subject entity comprises:

sending the association data structure to the claim issuing entity to cause the claim issuing entity to include the association data structure into the verified claim;

detecting a receipt of the verified claim including the association data structure from the claim issuing entity; and sending the verified claim including the association data structure to the relying entity.

18. The method of claim 12, wherein the association data structure is generated by a one-way encoding, such that the claim issuing entity cannot reconstruct the derived decentralized identifier from the association data structure.

19. The method of claim 18, wherein a message authentication code is generated from a seed that is generated using the derived decentralized identifier;

wherein the seed and the derived decentralized identifier are sent to the relying entity, such that the relying entity is able to verify that the message authentication code corresponds to the derived decentralized identifier.

20. A computing system, comprising:

one or more processors; and one or more computer-readable storage devices having computer-executable instructions that are executable by the one or more processors to configure the computing system to perform a method for using an association data structure corresponding to a derived decentralized identifier of a subject entity to share a verified claim about the subject entity to one or more relying entities, the method comprising:

deriving the decentralized identifier of a subject entity;

creating the association data structure using the derived decentralized identifier, the association data structure being structured to be interpretable by a relying entity as demonstrating that a verified claim provided by a claim issuing entity, which is neither the subject entity nor the relying entity, is about the derived decentralized identity; and causing the verified claim to be provided to the relying entity by at least causing the association data structure to be sent to the claim issuing entity, causing the claim issuing entity to include the association data structure with the verified claim, detecting a receipt of the verified claim including the association data structure from the claim issuing entity, and sending the verified claim including the association data structure to the relying entity.

* * * * *

UNITED STATES PATENT AND TRADEMARK OFFICE
CERTIFICATE OF CORRECTION

PATENT NO. : 11,245,524 B2  
APPLICATION NO. : 16/445099  
DATED : February 8, 2022  
INVENTOR(S) : Brandon Murdoch et al.

Page 1 of 1

It is certified that error appears in the above-identified patent and that said Letters Patent is hereby corrected as shown below:

On the Title Page

<u>In Item (73), Assignee</u>
Line 1, change "MICROSOFT TECHNOLOGLY LICENSING, LLC" to --MICROSOFT TECHNOLOGY LICENSING, LLC--

Signed and Sealed this  
Twelfth Day of April, 2022

Drew Hirshfeld  
*Performing the Functions and Duties of the*  
*Under Secretary of Commerce for Intellectual Property and*  
*Director of the United States Patent and Trademark Office*